(12) United States Patent
Mueck et al.

(10) Patent No.: US 8,521,109 B2
(45) Date of Patent: Aug. 27, 2013

(54) RADIO COMMUNICATION DEVICES, INFORMATION PROVIDERS, METHODS FOR CONTROLLING A RADIO COMMUNICATION DEVICE AND METHODS FOR CONTROLLING AN INFORMATION PROVIDER

(75) Inventors: Markus Dominik Mueck, Unterhaching (DE); Andreas Schmidt, Braunschweig (DE)

(73) Assignee: Intel Mobile Communications GmbH, Neubiberg (DE)

( * ) Notice: Subject to any disclaimer, the term of this patent is extended or adjusted under 35 U.S.C. 154(b) by 413 days.

(21) Appl. No.: 12/845,800

(22) Filed: Jul. 29, 2010

(65) Prior Publication Data
US 2012/0028638 A1 Feb. 2, 2012

(51) Int. Cl.
*H04B 17/02* (2006.01)

(52) U.S. Cl.
USPC ........................................ 455/137; 455/432.1

(58) Field of Classification Search
USPC ................ 455/550.1, 552.1, 553.1, 132, 137, 455/422.1, 432.1; 370/310, 328
See application file for complete search history.

(56) References Cited

U.S. PATENT DOCUMENTS

| | | | |
|---|---|---|---|
| 5,612,957 A | 3/1997 | Gregerson et al. | |
| 7,649,884 B1 | 1/2010 | Ahmed et al. | |
| 2006/0092872 A1 | 5/2006 | Lee et al. | |
| 2006/0274697 A1 | 12/2006 | Kim et al. | |
| 2007/0253348 A1* | 11/2007 | Sammarco | 370/260 |
| 2008/0013544 A1* | 1/2008 | Ginde et al. | 370/395.21 |
| 2008/0115184 A1 | 5/2008 | Choi et al. | |
| 2010/0027454 A1 | 2/2010 | Hou et al. | |
| 2010/0062800 A1 | 3/2010 | Gupta et al. | |
| 2010/0074183 A1 | 3/2010 | Chen et al. | |
| 2010/0172235 A1 | 7/2010 | Liu et al. | |
| 2012/0315951 A1* | 12/2012 | Karaoguz | 455/552.1 |

FOREIGN PATENT DOCUMENTS

| | | |
|---|---|---|
| CN | 101001472 A | 7/2007 |
| CN | 101420769 A | 4/2009 |
| WO | 2008094015 A1 | 8/2008 |

OTHER PUBLICATIONS

Hornsby, A.J. et al. "Network and Service Discovery in Heterogeneous Broadcast Environment"; Mobile and Wireless Communications Summit, 2007. 16th IST; Jul. 1-5, 2007; pp. 1-5.

Jen-Wen Ding et al. A Unified Approach to Heterogeneous Video-on-Demand Broadcasting, IEEE Transactions on; vol. 54, Issue 1, Mar. 2008, pp. 14-23.

Hongfei Du et al. "Supporting Scalable Multimedia Streaming over Converged DVB-H and DTMB Networks"; Communication Networks; 2008, ICC Workshops '08, IEEE International Conference on; May 19-23, 2008; pp. 276-280.

Hsiao-Ping Tsai et al. "On Channel Allocation for Heterogeneous Data Broadcasting"; Mobile Computing; IEEE transactions on; vol. 8, Issue 5, May 2009, pp. 694-708.

(Continued)

*Primary Examiner* — Nguyen Vo

(57) ABSTRACT

In an embodiment, a radio communication device may be provided. The radio communication device may include a first receiver configured to receive from a first cell first data representing a content encoded using a first codec; a second receiver configured to receive from a second cell second data representing the content encoded using a second codec; and a combiner configured to combine the first data and the second data.

11 Claims, 15 Drawing Sheets

(56) References Cited

OTHER PUBLICATIONS

3GPP TS 23.401, V10.0.0: "General Packet Radio Service (GPRS) enhancements for Evolved Universal Terrestrial Radio Access Network (E-UTRAN) access", Jun. 2010, pp. 1-261; http://www.3gpp.org/ftp/Specs/html-info/23401.htm.

English language abstract of CN 101420769 A dated Apr. 29, 2009.

English language abstract of CN 101001472 A dated Jul. 18, 2007.

Hongfei Du et al. "Downlink Scheduling for Multimedia Multicast/Broadcast over Mobile WiMAX: Connection-oriented Multi-state Adaptation", IEEE, Simon Fraser University, Burnaby, British Columbia, Canada, pp. 1 - 7; http://www.sfu.ca/~hda11/pdf/j08rnwcomsobwn.pdf, Publication year: 2009.

Shaoshuai Gao et al." Multiple Description Video Coding over Multiple Path Routing Networks, National Institute of Standards and Technology", pp. 1 - 6; http://www.antd.nistgov/pubs/Hamid-MDC.pdf; Publication year: 2006.

John W. Byers et al. "Accessing Multiple Mirror Sites in Parallel: Using Tornado Codes to Speed Up Downloads", pp. 1 - 9; Publication year: 1999.

\* cited by examiner

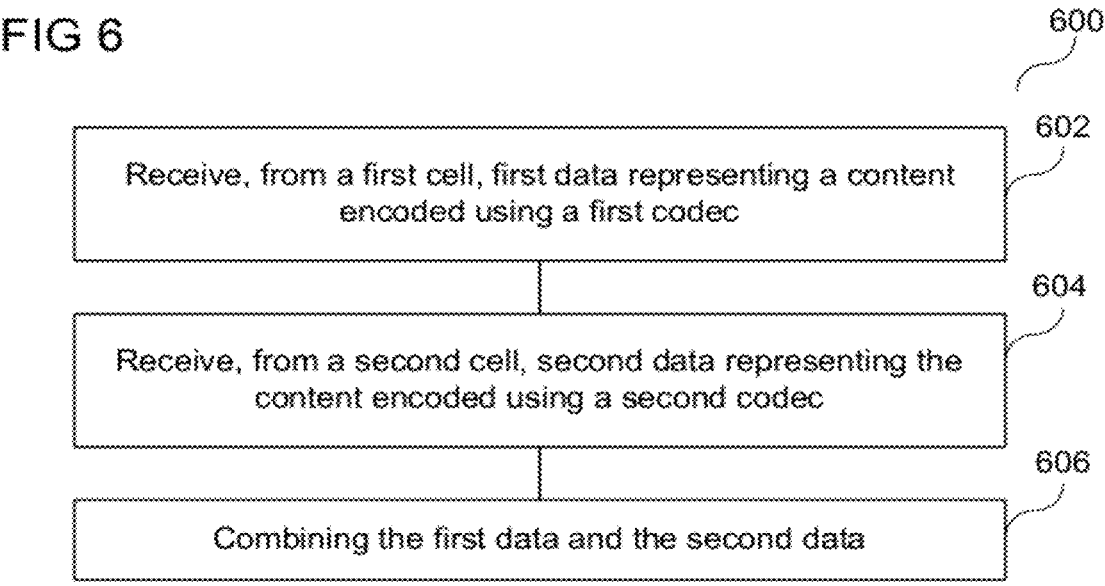

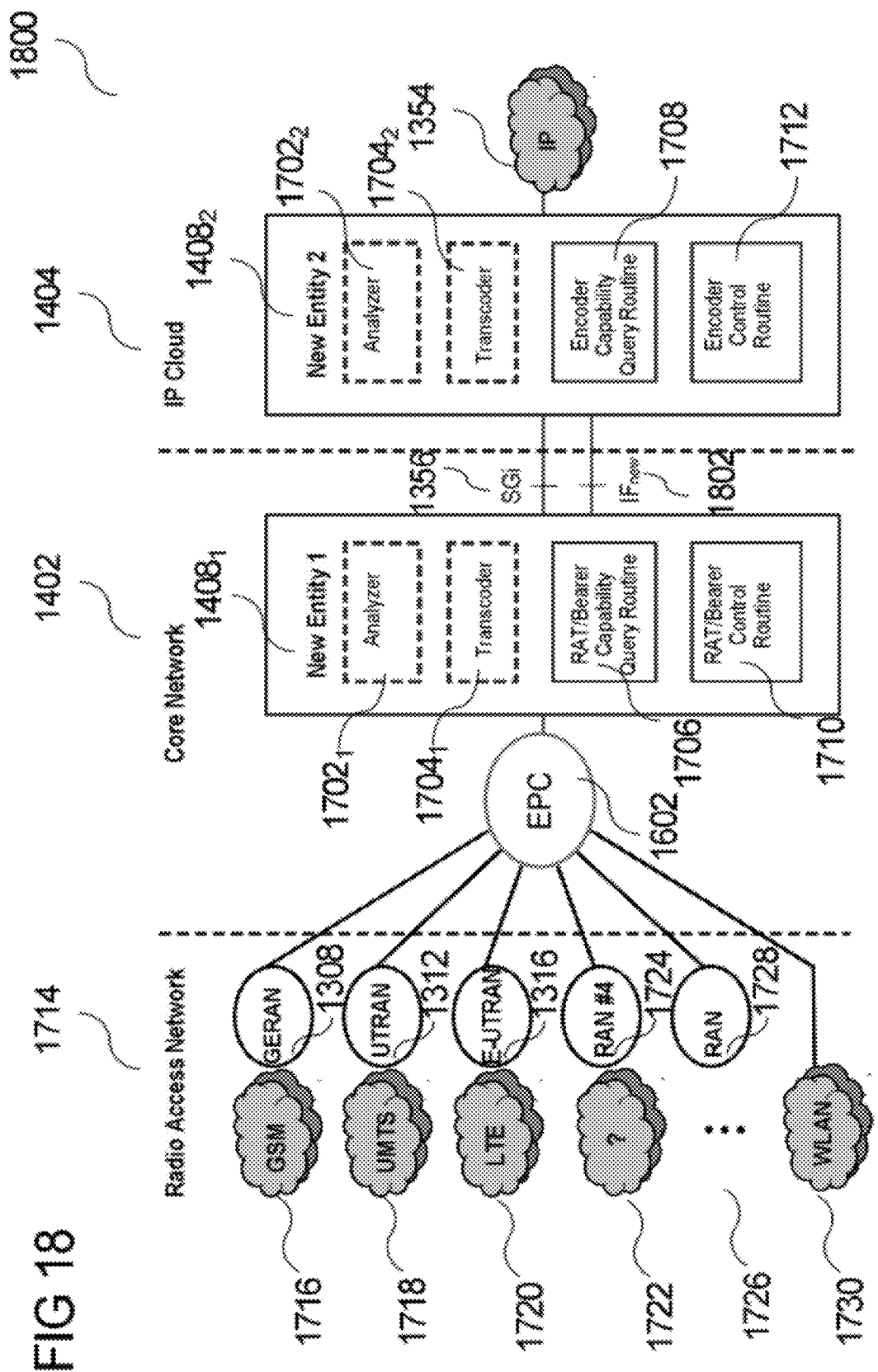

RADIO COMMUNICATION DEVICES, INFORMATION PROVIDERS, METHODS FOR CONTROLLING A RADIO COMMUNICATION DEVICE AND METHODS FOR CONTROLLING AN INFORMATION PROVIDER

TECHNICAL FIELD

Embodiments relate generally to radio communication devices, information providers, methods for controlling a radio communication device, and methods for controlling an information provider.

BACKGROUND

In various environments, mobile radio communication devices may simultaneously have access to a plurality of cells. For example in the case when the mobile radio communication devices are moving, the number and kind of cells that are available may change. For example, the radio communication device may move out of the range of a cell, or the radio communication device may enter the range of a cell.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which:

FIG. 6 shows a flow diagram illustrating a method for controlling a radio communication device in accordance with an embodiment;

FIG. 7 shows a flow diagram illustrating a method for controlling an information provider in accordance with an embodiment;

FIG. 18 shows a network architecture in accordance with an embodiment; and

DESCRIPTION

Figure 1:
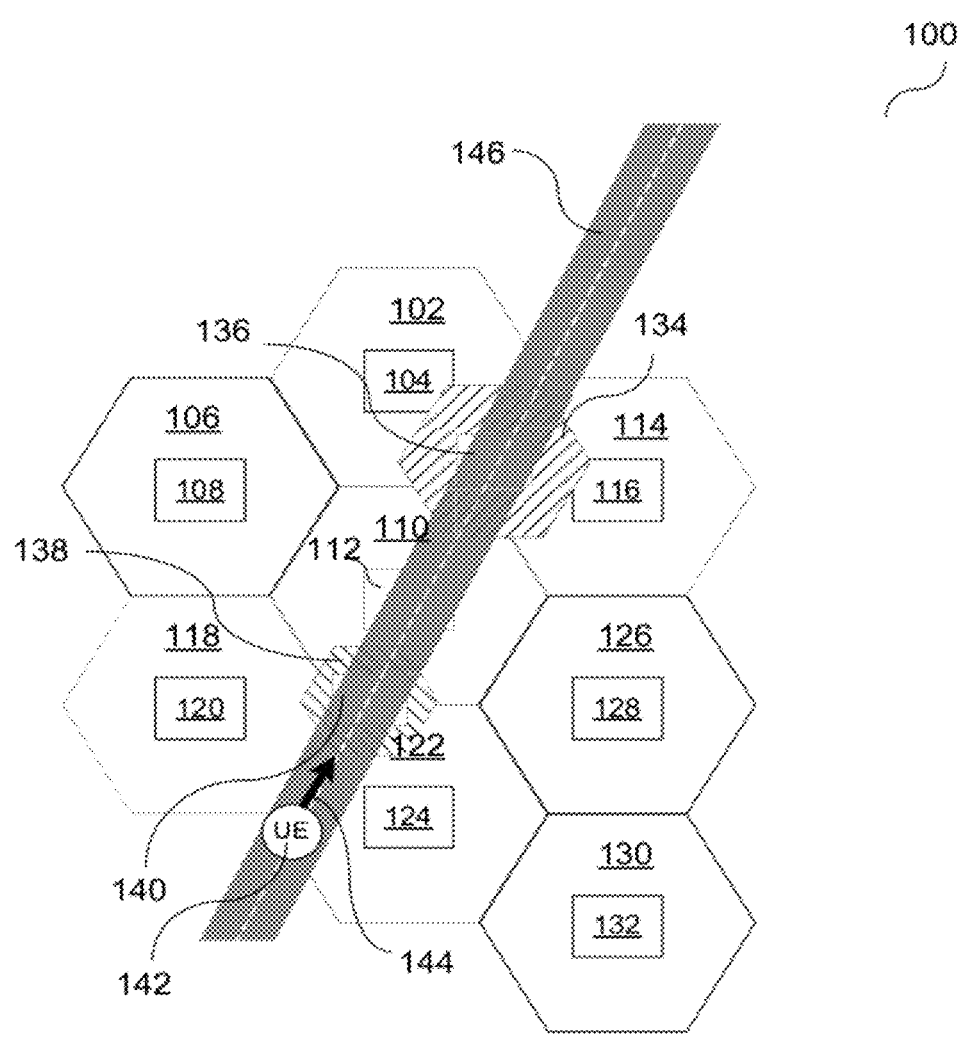
FIG. 1 shows an area, in which a heterogeneous broadcast/multicast service in accordance with an embodiment is provided.

According to various embodiments, a radio communication device may receive a plurality of data streams using a plurality of radio access technologies (RATs). The radio communication device may be able to decode each of the plurality of data streams on its own, for example to obtain video data included in the encoded data. In case the radio communication device is able to receive more than one data stream, it may combine the data streams, and may decode the combined data stream, and thereby may increase the quality of the decoded data, for example the quality of the decoded video.

The following detailed description refers to the accompanying drawings that show, by way of illustration, specific details and embodiments in which the invention may be practiced. Other embodiments may be utilized and structural, logical, and electrical changes may be made without departing from the scope of the invention. The various embodiments are not necessarily mutually exclusive, as some embodiments can be combined with one or more other embodiments to form new embodiments. The following detailed description therefore, is not to be taken in a limiting sense, and the scope of the present invention is defined by the appended claims.

The word "exemplary" is used herein to mean "serving as an example, instance, or illustration". Any embodiment or design described herein as "exemplary" is not necessarily to be construed as preferred or advantageous over other embodiments or designs.

A radio communication device according to various embodiments may be a device configured for wireless communication. In various embodiments, a radio communication device may be an end-user mobile device (MD). In various embodiments, a radio communication device may be any kind of mobile radio communication device, mobile telephone, personal digital assistant, mobile computer, or any other mobile device configured for communication with a mobile communication base station (BS) or an access point (AP) and may be also referred to as a User Equipment (UE), a mobile station (MS) or an advanced mobile station (advanced MS, AMS), for example in accordance with IEEE 802.16m.

A radio communication device according to various embodiments may include a memory which is for example used in the processing carried out by the end-user mobile devices. A memory used in the embodiments may be a volatile memory, for example a DRAM (Dynamic Random Access Memory) or a non-volatile memory, for example a PROM (Programmable Read Only Memory), an EPROM (Erasable PROM), EEPROM (Electrically Erasable PROM), or a flash memory, e.g., a floating gate memory, a charge trapping memory, an MRAM (Magnetoresistive Random Access Memory) or a PCRAM (Phase Change Random Access Memory).

An information provider according to various embodiments may include a memory which is for example used in the processing carried out by the radio base station. A memory used in the embodiments may be a volatile memory, for example a DRAM (Dynamic Random Access Memory) or a non-volatile memory, for example a PROM (Programmable Read Only Memory), an EPROM (Erasable PROM), EEPROM (Electrically Erasable PROM), or a flash memory, e.g., a floating gate memory, a charge trapping memory, an MRAM (Magnetoresistive Random Access Memory) or a PCRAM (Phase Change Random Access Memory).

In an embodiment, a "circuit" may be understood as any kind of a logic implementing entity, which may be special purpose circuitry or a processor executing software stored in a memory, firmware, or any combination thereof. Thus, in an embodiment, a "circuit" may be a hard-wired logic circuit or a programmable logic circuit such as a programmable processor, e.g. a microprocessor (e.g. a Complex Instruction Set Computer (CISC) processor or a Reduced Instruction Set Computer (RISC) processor). A "circuit" may also be a processor executing software, e.g. any kind of computer program, e.g. a computer program using a virtual machine code such as e.g. Java. Any other kind of implementation of the respective functions which will be described in more detail below may also be understood as a "circuit" in accordance with an alternative embodiment.

The terms "coupling" or "connection" are intended to include a direct "coupling" or direct "connection" as well as an indirect "coupling" or indirect "connection", respectively.

The term "protocol" is intended to include any piece of software that is provided to implement part of any layer of the communication definition. "Protocol" may include the functionality of one or more of the following layers: physical layer (layer 1), data link layer (layer 2), network layer (layer 3), or any other sub-layer of the mentioned layers or any upper layer.

The term "cell" is intended to include any kind of cell, for example a cell provided by a base station according to any of the radio access technologies mentioned below, for example a 3GPP (Third Generation Partnership Project) base station, a WiMax base station, or a WLAN (Wireless Local Area network) access point, as will be explained in more detail below. Furthermore, a cell may be a macro cell, a micro cell, a pico cell or a femto-cell, as will be explained in more detail below. Information received from a cell is intended to include information received of the respective base station or access point of that cell. Cells may overlap geographically, for example, more than one cell may be able to send information to a mobile radio terminal at a pre-determined geographical location.

According to various embodiments, "decoding" of data may be understood as processing the data to obtain "useful" information, for example processing data to obtain a series of images (for example a video) or a series of audio signals.

Various embodiments are provided for devices, and various embodiments are provided for methods. It will be understood that basic properties of the devices also hold for the methods and vice versa. Therefore, for sake of brevity, duplicate description of such properties may be omitted.

FIG. 1 shows an area 100, in which a heterogeneous broadcast/multicast service in accordance with an embodiment may be provided.

In the area 100, there may be provided a plurality of macrocells, for example one or a plurality of 3GPP (Third Generation Partnership Project) LTE (Long Term Evolution) macro cells, each served by (in other words: provided by) a standard eNodeB (eNB). For example, a first 3GPP LTE macro-cell 102 may be served by a first standard eNB 104. For example, a second 3GPP LTE macro-cell 106 may be served by a second standard eNB 108. For example, a third 3GPP LTE macro-cell 110 may be served by a third standard eNB 112. For example, a fourth 3GPP LTE macro-cell 114 may be served by a fourth standard eNB 116. For example, a fifth 3GPP LTE macro-cell 118 may be served by a fifth standard eNB 120. For example, a sixth 3GPP LTE macro-cell 122 may be served by a sixth standard eNB 124. For example, a seventh 3GPP LTE macro-cell 126 may be served by a seventh standard eNB 128. For example, an eighth 3GPP LTE macro-cell 130 may be served by an eighth standard eNB 132.

Furthermore, in the area 100, there may be one or a plurality of Femto-Cells served by 3GPP LTE HeNBs (Home eNB). According to various embodiments, a Femto-Cell may overlap with one or multiple standard eNBs. For example, a femto-cell 134 served by a HeNB 136 may be provided. The femto-cell 134 may overlap with the first macro-cell 102, with the third macro-cell 110, and the fourth macro-cell 114.

Furthermore, in the area 100, one or a plurality of WiFi Cells may be provided. WiFi cell may be under control by an entity different from the cellular network operator. For example, a WiFi cell 138 may be provided by WiFi base station 140.

In the area 100, a UE 142 may be considered, and the UE 142 may be moving through various cell coverage areas, as will be explained in more detail below, and as indicated by arrow 144 and road 146.

Figure 2:
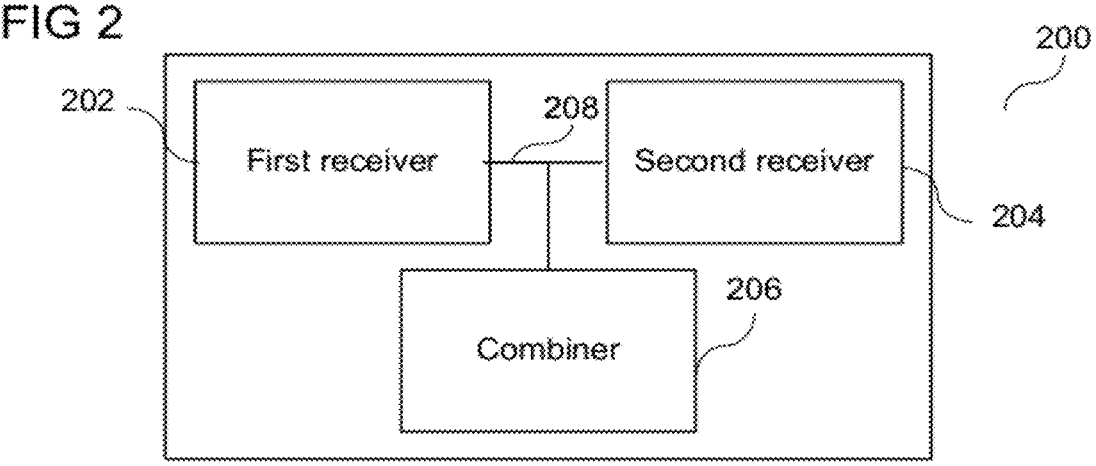
FIG. 2 shows a radio communication device in accordance with an embodiment.

FIG. 2 shows a radio communication device 200 in accordance with an embodiment. The radio communication device 200 may include a first receiver 202 configured to receive from a first cell first data representing a content encoded using a first codec; a second receiver 204 configured to receive from a second cell second data representing the content encoded using a second codec; and a combiner 206 configured to combine the first data and the second data. The first receiver 202, the second receiver 204 and the combiner 206 may be coupled with each other, e.g. via an electrical connection 208 such as e.g. a cable or a computer bus or via any other suitable electrical connection to exchange electrical signals.

The first cell and the second cell may be different. The first cell may be configured according to a first radio access technology. The second cell may be configured according to a second radio access technology.

According to various embodiments, the radio communication device may further include a decoder (not shown), configured to decode the combined data and a reception discontinuation determiner (not shown) configured to determine whether the first receiver stops receiving the first data and to determine whether the second receiver stops receiving the second data. The decoder may be further configured to decode the first data when the reception discontinuation determiner determines that the second receiver stops receiving the second data. The decoder may be further configured to decode the second data when the reception discontinuation determiner determines that the first receiver stops receiving the first data.

According to various embodiments, the decoder may be configured to decode the first data when the reception discontinuation determiner determines that the second receiver stops receiving the second data and that the first receiver does not stop receiving the first data. The decoder may be further configured to decode the second data when the reception discontinuation determiner determines that the first receiver stops receiving the first data and that the second receiver does not stop receiving the second data.

According to various embodiments, the first codec and the second codec may be parts of an overall codec. For example, the first codec and the second codec may not operate independent from each other, but may operate in co-operation. According to various embodiments, the codecs may apply a "Multiple Description Coding (MDC)" approach, in other words, the first codec and the second codec may be configured according to a "Multiple Description Coding (MDC)" approach.

In various embodiments, the radio communication device 200 may further include at least one further receiver (not shown) configured to receive from a further cell further data representing the content encoded using a further codec. The further cell may be configured according to a further radio access technology. According to various embodiments, any number of receivers may receive any number of data (for example any number of data flows) representing the content encoded using various codecs, and any data alone or any combinations of the data may be used to decode the content. The number of receivers may not have to be identical to the number of data, for example, the number of data may be higher than the number of receivers, so that at least one receiver receives more than one data.

In various embodiments, at least one of the first radio access technology and the second radio access technology may be a radio access technology of one of the following radio access technology families:
   a Short Range radio access technology family;
   a Metropolitan Area System radio access technology family;
   a Cellular Wide Area radio access technology family;
   a radio access technology family which includes a radio access technology in which the access to radio resources is provided in a random manner; and
   a radio access technology family which includes a radio access technology in which the access to radio resources is provided in a centrally controlled manner.

In various embodiments, at least one of the first radio access technology and the second radio access technology may be one of the following radio access technologies: a Bluetooth radio access technology, an Ultra Wide Band (UWB) radio access technology, a Wireless Local Area Network radio access technology (e.g. according to an IEEE 802.11 (e.g. IEEE 802.11n) radio communication standard)), IrDA (Infrared Data Association), Z-Wave and ZigBee, HiperLAN/2 ((HIgh PErformance Radio LAN; an alternative ATM-like 5 GHz standardized technology), IEEE 802.11a (5 GHz), IEEE 802.11g (2.4 GHz), IEEE 802.11n, IEEE 802.11VHT (VHT=Very High Throughput), e.g. IEEE 802.11ac for VHT below 6 GHz and IEEE 802.11ad for VHT at 60 GHz, a Worldwide Interoperability for Microwave Access (WiMax) (e.g. according to an IEEE 802.16 radio communication standard, e.g. WiMax fixed or WiMax mobile), WiPro, HiperMAN (High Performance Radio Metropolitan Area Network), IEEE 802.16m Advanced Air Interface, a Global System for Mobile Communications (GSM) radio access technology, a General Packet Radio Service (GPRS) radio access technology, an Enhanced Data Rates for GSM Evolution (EDGE) radio access technology, and/or a Third Generation Partnership Project (3GPP) radio access technology (e.g. UMTS (Universal Mobile Telecommunications System), FOMA (Freedom of Multimedia Access), 3GPP LTE (long term Evolution), 3GPP LTE Advanced (long term Evolution Advanced)), CDMA2000 (Code division multiple access 2000), CDPD (Cellular Digital Packet Data), Mobitex, 3G (Third Generation), CSD (Circuit Switched Data), HSCSD (High-Speed Circuit-Switched Data), UMTS (3G) (Universal Mobile Telecommunications System (Third Generation)), W-CDMA (UMTS) (Wideband Code Division Multiple Access (Universal Mobile Telecommunications System)), HSPA (High Speed Packet Access), HSDPA (High-Speed Downlink Packet Access), HSUPA (High-Speed Uplink Packet Access), HSPA+ (High Speed Packet Access Plus), UMTS-TDD (Universal Mobile Telecommunications System-Time-Division Duplex), TD-CDMA (Time Division-Code Division Multiple Access), TD-SCDMA (Time Division-Synchronous Code Division Multiple Access), 3GPP Rel. 8 (Pre-4G) (3rd Generation Partnership Project Release 8 (Pre-4th Generation)), UTRA (UMTS Terrestrial Radio Access), E-UTRA (Evolved UMTS Terrestrial Radio Access), LTE Advanced (4G) (long term Evolution Advanced (4th Generation)), cdmaOne (2G), CDMA2000 (3G) (Code division multiple access 2000 (Third generation)), EV-DO (Evolution-Data Optimized or Evolution-Data Only), AMPS (1G) (Advanced Mobile Phone System (1st Generation)), TACS/ETACS (Total Access Communication System/Extended Total Access Communication System), D-AMPS (2G) (Digital AMPS (2nd Generation)), PTT (Push-to-talk), MTS (Mobile Telephone System), IMTS (Improved Mobile Telephone System), AMTS (Advanced Mobile Telephone System), OLT (Norwegian for Offentlig Landmobil Telefoni, Public Land Mobile Telephony), MTD (Swedish abbreviation for Mobiltelefonisystem D, or Mobile telephony system D), Autotel/PALM (Public Automated Land Mobile), ARP (Finnish for Autoradiopuhelin, "car radio phone"), NMT (Nordic Mobile Telephony), Hicap (High capacity version of NTT (Nippon Telegraph and Telephone)), CDPD (Cellular Digital Packet Data), Mobitex, DataTAC, iDEN (Integrated Digital Enhanced Network), PDC (Personal Digital Cellular), PHS (Personal Handy-phone System), WiDEN (Wideband Integrated Digital Enhanced Network), iBurst, and Unlicensed Mobile Access (UMA, also referred to as 3GPP Generic Access Network, or GAN standard)).

In various embodiments, at least one of the first receiver 202 and the second receiver 204 may be configured to receive the data using at least one of unicast, multicast and broadcast.

In various embodiments, the first radio access technology and the second radio access technology may be different.

In various embodiments, the first radio access technology and the second radio access technology may be identical.

In various embodiments, the first codec and the second codec may be multiple description codecs, as will be explained in more detail below.

In various embodiments, the first codec and the second codec may be video codecs.

In various embodiments, the first codec and the second codec may be audio codecs.

In various embodiments, the radio communication device 200 may further include a first decoder (not shown) configured to decode the first data to obtain the content.

In various embodiments, the radio communication device 200 may further include a second decoder (not shown) configured to decode the second data to obtain the content.

In various embodiments, the radio communication device 200 may further include a combined decoder (not shown) configured to decode the combined first data and second data to obtain the content.

In various embodiments, the radio communication device 200 may further include a decoder (not shown), wherein the decoder may be configured to decode the first data to obtain the content; wherein the decoder may be further configured to decode the second data to obtain the content; and wherein the decoder may be further configured to decode the combined first data and second data to obtain the content.

In various embodiments, the quality of the decoded content may be higher when it is decoded from the combined first data and second data compared to when it is decoded from the first data alone or when it is decoded from the second data alone.

In various embodiments, the radio communication device 200 may further include an output circuit (not shown) configured to output the decoded content.

In various embodiments, the output circuit may include at least one of a display and a loudspeaker.

Figure 3:
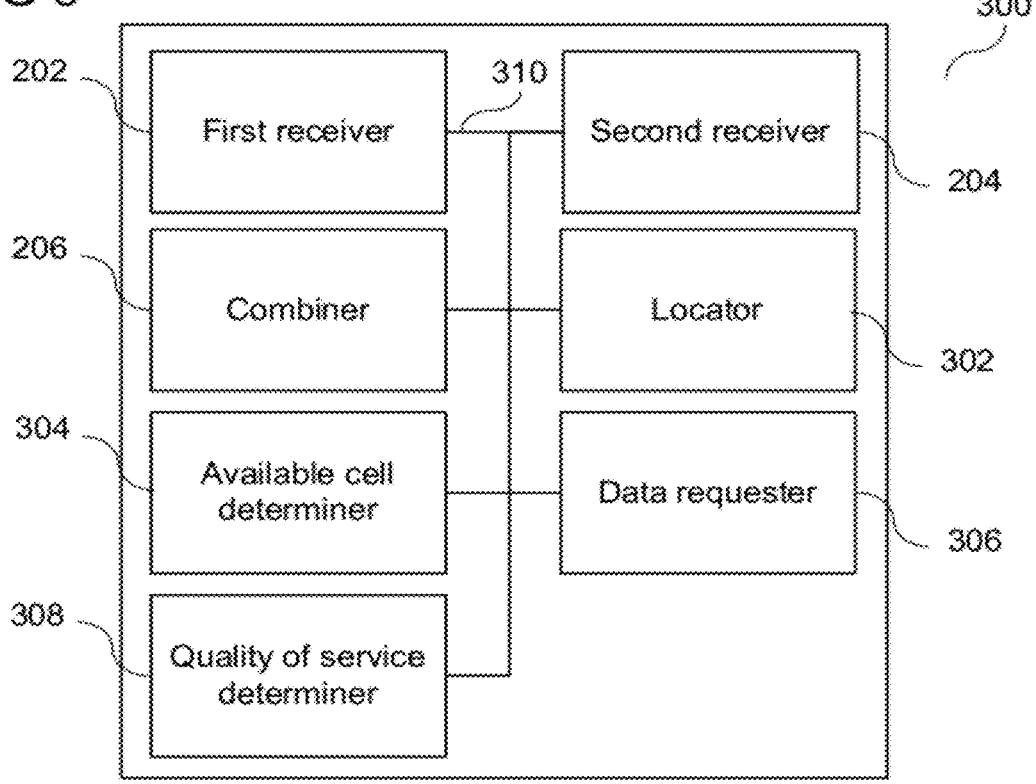
FIG. 3 shows a radio communication device in accordance with an embodiment.

FIG. 3 shows a radio communication device 300 in accordance with an embodiment. The radio communication device 300 may include, similar to the radio communication device 200 of FIG. 2, a first receiver 202, a second receiver 204, and a combiner 206. The radio communication device 300 may further include a locator 302, as will be explained in more detail below. The radio communication device 300 may further include an available cell determiner 304, as will be explained in more detail below. The radio communication device 300 may further include a data requester 306, as will be explained in more detail below. The radio communication device 300 may further include a quality of service determiner 308, as will be explained in more detail below. The first receiver 202, the second receiver 204, the combiner 206, the locator 302, the available cell determiner 304, the data requester 306, and the quality of service determiner 308 may be coupled with each other, e.g. via an electrical connection 310 such as e.g. a cable or a computer bus or via any other suitable electrical connection to exchange electrical signals.

In various embodiments, the locator 302 may be configured to determine the position of the radio communication device 300.

In various embodiments, the radio communication device 300 may further include a position information transmitter (not shown) configured to transmit information representing the position determined by the locator 302 to an information provider (not shown).

In various embodiments, the available cell determiner 304 may be configured to determine, whether a predetermined cell is available for the radio communication device 300. According to various embodiments, the available cell determiner 304 may further be configured to determine the most suitable combination of Radio Access technologies, for example such that the overall power consumption is minimized in the UE, or that the subscription cost for the user is minimized.

In various embodiments, the radio communication device 300 may further include an available cell information transmitter (not shown) configured to transmit information indicating whether the pre-determined cell is available for the radio communication device 300 to an information provider.

In various embodiments, the radio communication device 300 may further include a data reception determiner (not shown) configured to determine whether data representing the content is received using a pre-determined cell.

In various embodiments, the data requester 306 may be configured to request transmission of further data representing the content encoded using a further codec from a further cell from an information provider.

In various embodiments, the quality of service determiner 308 may be configured to determine a required quality of service of the content for the radio communication device 300.

In various embodiments, the radio communication device 300 may further include a quality of service information transmitter (not shown) configured to transmit information representing the quality of service determined by the quality of service determiner 308 to an information provider.

Figure 4:
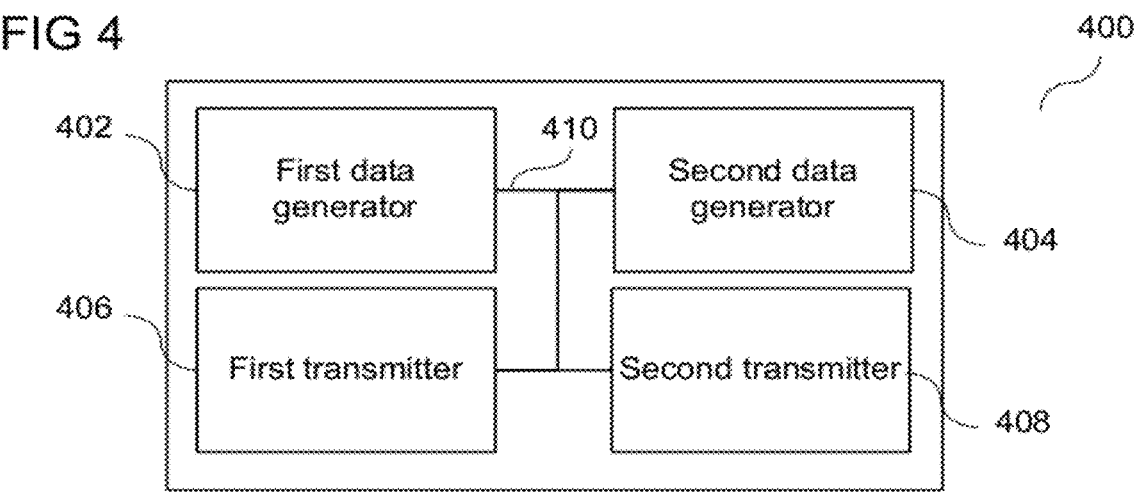
FIG. 4 shows an information provider in accordance with an embodiment.

FIG. 4 shows an information provider 400 in accordance with an embodiment. The information provider 400 may include a first data generator 402 configured to generate first data from a content using a first codec; a second data generator 404 configured to generate second data from the content using a second codec; a first transmitter 406 configured to transmit using a first cell the first data; and a second transmitter 408 configured to transmit using a second cell the second data. The first data generator 402, the second data generator 404, the first transmitter 406, and the second transmitter 408 may be coupled with each other, e.g. via an electrical connection 410 such as e.g. a cable or a computer bus or via any other suitable electrical connection to exchange electrical signals.

The first cell and the second cell may be different. The first cell may be configured according to a first radio access technology. The second cell may be configured according to a second radio access technology.

According to various embodiments, the information provider may further include an available cell determiner (not shown) configured to determine a plurality of cells that is available for transmitting the first data and the second data to a radio communication device; and a cell selector (not shown) configured to select the first cell and the second cell from the plurality of cells based on a pre-determined criterion. For example, the available cell determiner may be configured to determine, for a pre-determined radio communication device, which cells may provide radio services to the radio communication device, and may select one of these cells as the first cell and another one of these cells as the second cell.

According to various embodiments, the pre-determined criterion may include a criterion based on a coverage area of the first cell and of the second cell. For example, at least one of the first cell and the second cell may be chosen so as to cover an area with at least a pre-determined size. For example, this may ensure that even if the radio communication device moves over large distances, at least one data flow is constantly received.

According to various embodiments, the pre-determined criterion may include a criterion based on a transmission bandwidth of the first cell and of the second cell. For example, at least one of the first cell and the second cell may be chosen so as to be a cell that may provide a transmission bandwidth (in other words: a transmission speed) of at least a pre-determined amount. For example, this may ensure that a pre-determined amount of data arrives in every time interval at the radio communication device.

According to various embodiments, both a cell with at least a pre-determined coverage area (for example as the first cell) and a cell with at least a pre-determined transmission bandwidth (for example as the second cell) may be chosen. This may ensure both that even if the radio communication device moves over large distances, at least one data flow is constantly received, and that a pre-determined amount of data arrives in every time interval at the radio communication device.

In various embodiments, the information provider 400 may further include at least one further data generator (not shown) configured to generate further data from the content encoded using a further codec; and at least one further transmitter (not shown) configured to transmit using a further cell the further data. The further cell may be configured according to a further radio access technology.

In various embodiments, at least one of the first radio access technology and the second radio access technology may be a radio access technology of one of the following radio access technology families:

a Short Range radio access technology family;
a Metropolitan Area System radio access technology family;
a Cellular Wide Area radio access technology family;

a radio access technology family which includes a radio access technology in which the access to radio resources is provided in a random manner; and a radio access technology family which includes a radio access technology in which the access to radio resources is provided in a centrally controlled manner.

In various embodiments, at least one of the first radio access technology and the second radio access technology may be one of the following radio access technologies: a Bluetooth radio access technology, an Ultra Wide Band (UWB) radio access technology, a Wireless Local Area Network radio access technology (e.g. according to an IEEE 802.11 (e.g. IEEE 802.11n) radio communication standard)), IrDA (Infrared Data Association), Z-Wave and ZigBee, HiperLAN/2 ((High PErformance Radio LAN; an alternative ATM-like 5 GHz standardized technology), IEEE 802.11a (5 GHz), IEEE 802.11g (2.4 GHz), IEEE 802.11n, IEEE 802.11VHT (VHT=Very High Throughput), e.g. IEEE 802.11ac for VHT below 6 GHz and IEEE 802.11ad for VHT at 60 GHz, a Worldwide Interoperability for Microwave Access (WiMax) (e.g. according to an IEEE 802.16 radio communication standard, e.g. WiMax fixed or WiMax mobile), WiPro, HiperMAN (High Performance Radio Metropolitan Area Network), IEEE 802.16m Advanced Air Interface, a Global System for Mobile Communications (GSM) radio access technology, a General Packet Radio Service (GPRS) radio access technology, an Enhanced Data Rates for GSM Evolution (EDGE) radio access technology, and/or a Third Generation Partnership Project (3GPP) radio access technology (e.g. UMTS (Universal Mobile Telecommunications System), FOMA (Freedom of Multimedia Access), 3GPP LTE (long term Evolution), 3GPP LTE Advanced (long term Evolution Advanced)), CDMA2000 (Code division multiple access 2000), CDPD (Cellular Digital Packet Data), Mobitex, 3G (Third Generation), CSD (Circuit Switched Data), HSCSD (High-Speed Circuit-Switched Data), UMTS (3G) (Universal Mobile Telecommunications System (Third Generation)), W-CDMA (UMTS) (Wideband Code Division Multiple Access (Universal Mobile Telecommunications System)), HSPA (High Speed Packet Access), HSDPA (High-Speed Downlink Packet Access), HSUPA (High-Speed Uplink Packet Access), HSPA+ (High Speed Packet Access Plus), UMTS-TDD (Universal Mobile Telecommunications System-Time-Division Duplex), TD-CDMA (Time Division-Code Division Multiple Access), TD-SCDMA (Time Division-Synchronous Code Division Multiple Access), 3GPP Rel. 8 (Pre-4G) (3rd Generation Partnership Project Release 8 (Pre-4th Generation)), UTRA (UMTS Terrestrial Radio Access), E-UTRA (Evolved UMTS Terrestrial Radio Access), LTE Advanced (4G) (long term Evolution Advanced (4th Generation)), cdmaOne (2G), CDMA2000 (3G) (Code division multiple access 2000 (Third generation)), EV-DO (Evolution-Data Optimized or Evolution-Data Only), AMPS (1G) (Advanced Mobile Phone System (1st Generation)), TACS/ETACS (Total Access Communication System/Extended Total Access Communication System), D-AMPS (2G) (Digital AMPS (2nd Generation)), PTT (Push-to-talk), MTS (Mobile Telephone System), IMTS (Improved Mobile Telephone System), AMTS (Advanced Mobile Telephone System), OLT (Norwegian for Offentlig Landmobil Telefoni, Public Land Mobile Telephony), MTD (Swedish abbreviation for Mobiltelefonisystem D, or Mobile telephony system D), Autotel/PALM (Public Automated Land Mobile), ARP (Finnish for Autoradiopuhelin, "car radio phone"), NMT (Nordic Mobile Telephony), Hicap (High capacity version of NTT (Nippon Telegraph and Telephone)), CDPD (Cellular Digital Packet Data), Mobitex, DataTAC, iDEN (Integrated Digital Enhanced Network), PDC (Personal Digital Cellular), PHS (Personal Handy-phone System), WiDEN (Wideband Integrated Digital Enhanced Network), iBurst, and Unlicensed Mobile Access (UMA, also referred to as 3GPP Generic Access Network, or GAN standard)).

In various embodiments, at least one of the first transmitter 406 and the second transmitter 408 may be configured to transmit the data using at least one of unicast, multicast and broadcast.

In various embodiments, the first radio access technology and the second radio access technology may be different.

In various embodiments, the first radio access technology and the second radio access technology may be identical.

In various embodiments, the first codec and the second codec may be multiple description codecs, as will be explained in more detail below.

In various embodiments, the first codec and the second codec may be video codecs.

In various embodiments, the first codec and the second codec may be audio codecs.

In various embodiments, the first codec and the second codec may be configured so that a decoder can decode the first data to obtain the content.

In various embodiments, the first codec and the second codec may be configured so that a decoder can decode the second data to obtain the content.

In various embodiments, the first codec and the second codec may be configured so that a decoder can decode a combination of the first data and second data to obtain the content.

In various embodiments, the first codec and the second codec may be configured so that a decoder can decode the first data to obtain the content; where the first codec and the second codec may be further configured so that the same decoder can decode the second data to obtain the content; and wherein the first codec and the second codec may be further configured so that the same decoder can decode a combination of the first data and second data to obtain the content.

In various embodiments, the quality of the decoded content may be higher when it is decoded from the combined first data and second data compared to when it is decoded from the first data alone or when it is decoded from the second data alone.

Figure 5:
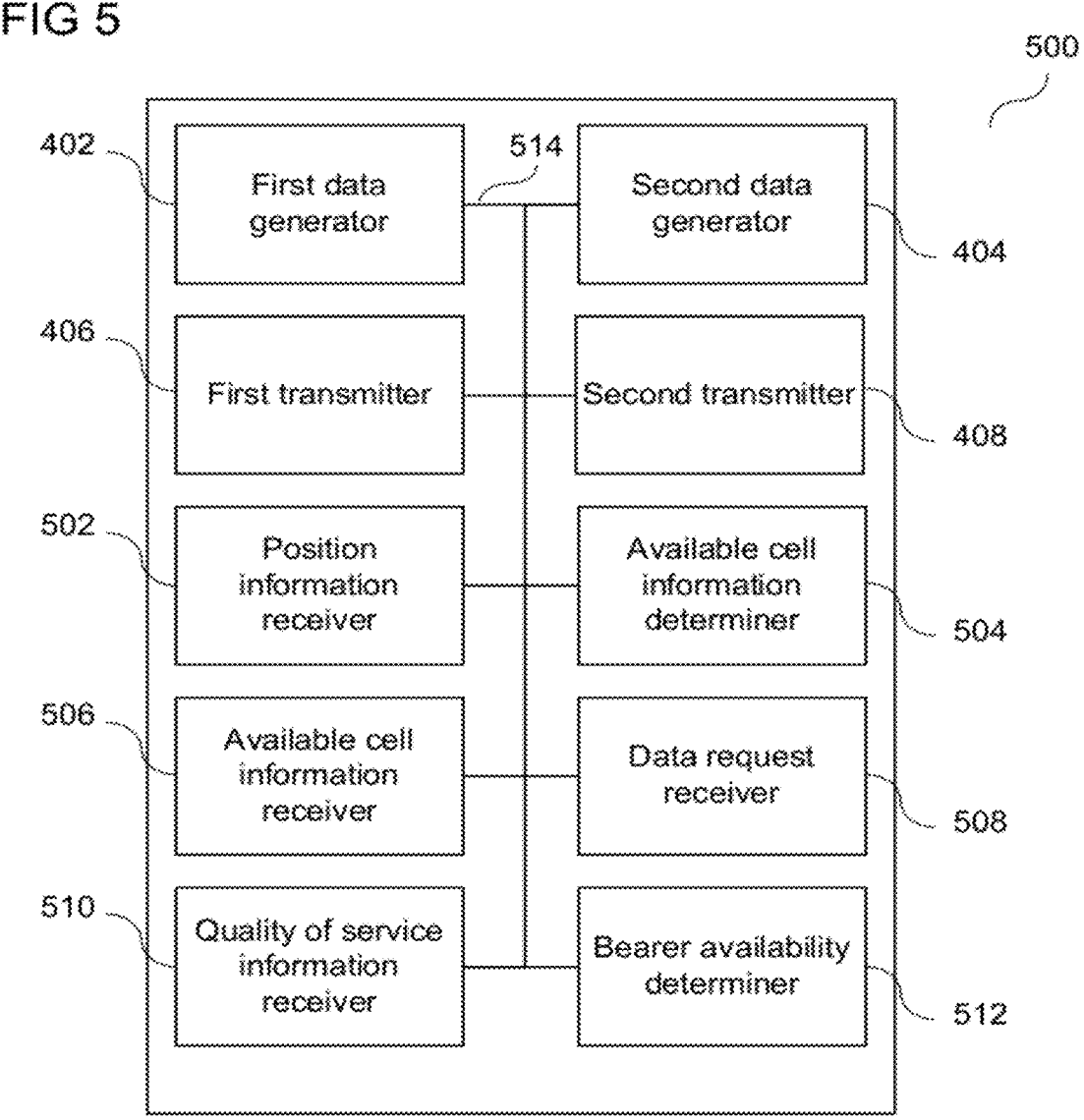
FIG. 5 shows an information provider in accordance with an embodiment.

FIG. 5 shows an information provider 500 in accordance with an embodiment. The information provider 500 may include, similar to the information provider 400 of FIG. 4, a first data generator 402, a second data generator 404, a first transmitter 406, and a second transmitter 408. The information provider 500 may further include a position information receiver 502, as will be explained in more detail below. The information provider 500 may further include an available cell information determiner 504, as will be explained in more detail below. The information provider 500 may further include an available cell information receiver 506, as will be explained in more detail below. The information provider 500 may further include a data request receiver 508, as will be explained in more detail below. The information provider 500 may further include a quality of service information receiver 510, as will be explained in more detail below. The information provider 500 may further include a bearer availability determiner 512, as will be explained in more detail below. The first data generator 402, the second data generator 404, the first transmitter 406, the second transmitter 408, the position information receiver 502, the available cell information determiner 504, the available cell information receiver 506, the data request receiver 508, the quality of service information receiver 510, and the bearer availability determiner 512 may be coupled with each other, e.g. via an electrical connection 514 such as e.g. a cable or a computer bus or via any other suitable electrical connection to exchange electrical signals.

In various embodiments, the position information receiver 502 may be configured to receive information representing a position of a radio communication device.

In various embodiments, the available cell information determiner 504 may be configured to determine whether a pre-determined cell is available for the radio communication device based on the position information received by the position information receiver 502. According to various embodiments, the available cell information determiner 504 may further be configured to determine the most suitable combination of Radio Access technologies, for example such that the overall power consumption is minimized in the UE, or that the subscription cost for the user is minimized.

According to various embodiments, a device of the network (for example the information provider) may analyze the most used Radio Access Technologies (RAT) in a given area, may create a number of redundant flows (for example a number of redundant data) and may broadcast them following the level of RAT acceptance by the users in a given area.

In various embodiments, the information provider 500 may further include an encoding parameter determiner (not shown) configured to determine coding parameters for at least one of the first codec and the second codec, based on the determination whether a pre-determined cell is available for the radio communication device.

In various embodiments, the available cell information receiver 506 may be configured to receive information indicating whether a pre-determined cell is available for a radio communication device.

In various embodiments, the information provider 500 may further include an encoding parameter determiner (not shown) configured to determine coding parameters for at least one of the first codec and the second codec, based on the received information indicating whether a pre-determined cell is available for the radio communication device.

In various embodiments, the data request receiver 508 may be configured to receive from a radio communication device (not shown) a request for transmission of further data representing the content encoded using a further codec using a further cell.

In various embodiments, the quality of service information receiver 510 may be configured to receive information representing the required quality of service of the content for a radio communication device.

In various embodiments, the information provider 500 may further include an encoding parameter determiner (not shown) configured to determine coding parameters for at least one of the first codec and the second codec, based on the received information representing the required quality of service.

In various embodiments, the bearer availability determiner 512 may be configured to determine whether a bearer for a pre-determined cell is available.

In various embodiments, the information provider 500 may further include an encoding parameter determiner (not shown) configured to determine coding parameters for at least one of the first codec and the second codec, based on the determination whether a bearer for a pre-determined cell is available.

In various embodiments, at least one of the first data generator 402 and the second data generator 404 may generate the data by encoding the content.

In various embodiments, the information provider may further include a storage (not shown), configured to store data representing the content encoded using a codec; wherein at least one of the first data generator or the second data generator generates the data by retrieving data from the storage.

FIG. 6 shows a flow diagram 600 illustrating a method for controlling a radio communication device in accordance with an embodiment. In 602, first data representing a content encoded using a first codec may be received from a first cell. In 604, second data representing the content encoded using a second codec may be received from a second cell. In 606, the first data and the second data may be combined.

The first cell and the second cell may be different. The first cell may be configured according to a first radio access technology. The second cell may be configured according to a second radio access technology.

According to various embodiments, the method may further include decoding the combined data, determining whether receiving the first data is stopped, determining whether receiving the second data is stopped, decoding the first data when it is determined that receiving the second data is stopped, and decoding the second data when it is determined that receiving the first data is stopped.

According to various embodiments, the first data may be decoded when it is determined that receiving the second data is stopped and that receiving the first data is not stopped. According to various embodiments, the second data may be decoded when it is determined that receiving the first data is stopped and that receiving the second data is not stopped.

According to various embodiments, the first codec and the second codec may be parts of an overall codec. For example, the first codec and the second codec may not operate independent from each other, but may operate in co-operation. According to various embodiments, the codecs may apply a "Multiple Description Coding (MDC)", in other words, the first codec and the second codec may be configured according to a "Multiple Description Coding (MDC)" approach.

In various embodiments, further data representing the content encoded using a further codec may be received from a further cell. The further cell may be configured according to a further radio access technology. According to various embodiments, any number of receivers may receive any number of data (for example any number of data flows) representing the content encoded using various codecs, and any data alone or any combinations of the data may be used to decode the content. The number of receivers may not have to be identical to the number of data, for example, the number of data may be higher than the number of receivers, so that at least one receiver receives more than one data.

In various embodiments, at least one of the first radio access technology and the second radio access technology may be a radio access technology of one of the following radio access technology families:
  a Short Range radio access technology family;
  a Metropolitan Area System radio access technology family;
  a Cellular Wide Area radio access technology family;
  a radio access technology family which includes a radio access technology in which the access to radio resources is provided in a random manner; and
  a radio access technology family which includes a radio access technology in which the access to radio resources is provided in a centrally controlled manner.

In various embodiments, at least one of the first radio access technology and the second radio access technology may be one of the following radio access technologies: a Bluetooth radio access technology, an Ultra Wide Band (UWB) radio access technology, a Wireless Local Area Network radio access technology (e.g. according to an IEEE 802.11 (e.g. IEEE 802.11n) radio communication standard)), IrDA (Infrared Data Association), Z-Wave and ZigBee, HiperLAN/2 ((HIgh PErformance Radio LAN; an alternative ATM-like 5 GHz standardized technology), IEEE 802.11a (5 GHz), IEEE 802.11g (2.4 GHz), IEEE 802.11n, IEEE 802.11VHT (VHT=Very High Throughput), e.g. IEEE 802.11ac for VHT below 6 GHz and IEEE 802.11ad for VHT at 60 GHz, a Worldwide Interoperability for Microwave Access (WiMax) (e.g. according to an IEEE 802.16 radio communication standard, e.g. WiMax fixed or WiMax mobile), WiPro, HiperMAN (High Performance Radio Metropolitan Area Network), IEEE 802.16m Advanced Air Interface, a Global System for Mobile Communications (GSM) radio access technology, a General Packet Radio Service (GPRS) radio access technology, an Enhanced Data Rates for GSM Evolution (EDGE) radio access technology, and/or a Third Generation Partnership Project (3GPP) radio access technology (e.g. UMTS (Universal Mobile Telecommunications System), FOMA (Freedom of Multimedia Access), 3GPP LTE (long term Evolution), 3GPP LTE Advanced (long term Evolution Advanced)), CDMA2000 (Code division multiple access 2000), CDPD (Cellular Digital Packet Data), Mobitex, 3G (Third Generation), CSD (Circuit Switched Data), HSCSD (High-Speed Circuit-Switched Data), UMTS (3G) (Universal Mobile Telecommunications System (Third Generation)), W-CDMA (UMTS) (Wideband Code Division Multiple Access (Universal Mobile Telecommunications System)), HSPA (High Speed Packet Access), HSDPA (High-Speed Downlink Packet Access), HSUPA (High-Speed Uplink Packet Access), HSPA+ (High Speed Packet Access Plus), UMTS-TDD (Universal Mobile Telecommunications System-Time-Division Duplex), TD-CDMA (Time Division-Code Division Multiple Access), TD-SCDMA (Time Division-Synchronous Code Division Multiple Access), 3GPP Rel. 8 (Pre-4G) (3rd Generation Partnership Project Release 8 (Pre-4th Generation)), UTRA (UMTS Terrestrial Radio Access), E-UTRA (Evolved UMTS Terrestrial Radio Access), LTE Advanced (4G) (long term Evolution Advanced (4th Generation)), cdmaOne (2G), CDMA2000 (3G) (Code division multiple access 2000 (Third generation)), EV-DO (Evolution-Data Optimized or Evolution-Data Only), AMPS (1G) (Advanced Mobile Phone System (1st Generation)), TACS/ETACS (Total Access Communication System/Extended Total Access Communication System), D-AMPS (2G) (Digital AMPS (2nd Generation)), PTT (Push-to-talk), MTS (Mobile Telephone System), IMTS (Improved Mobile Telephone System), AMTS (Advanced Mobile Telephone System), OLT (Norwegian for Offentlig Landmobil Telefoni, Public Land Mobile Telephony), MTD (Swedish abbreviation for Mobiltelefonisystem D, or Mobile telephony system D), Autotel/PALM (Public Automated Land Mobile), ARP (Finnish for Autoradiopuhelin, "car radio phone"), NMT (Nordic Mobile Telephony), Hicap (High capacity version of NTT (Nippon Telegraph and Telephone)), CDPD (Cellular Digital Packet Data), Mobitex, DataTAC, iDEN (Integrated Digital Enhanced Network), PDC (Personal Digital Cellular), PHS (Personal Handy-phone System), WiDEN (Wideband Integrated Digital Enhanced Network), iBurst, and Unlicensed Mobile Access (UMA, also referred to as 3GPP Generic Access Network, or GAN standard)).

In various embodiments, the data may be received using at least one of unicast, multicast and broadcast.

In various embodiments, the first radio access technology and the second radio access technology may be different.

In various embodiments, the first radio access technology and the second radio access technology may be identical.

In various embodiments, the first codec and the second codec may be multiple description codecs, as will be explained in more detail below.

In various embodiments, the first codec and the second codec may be video codecs.

In various embodiments, the first codec and the second codec may be audio codecs.

In various embodiments, the first data may be decoded to obtain the content.

In various embodiments, the second data may be decoded to obtain the content.

In various embodiments, the combined first data and second data may be decoded to obtain the content.

In various embodiments, the quality of the decoded content may be higher when it is decoded from the combined first data and second data compared to when it is decoded from the first data alone or when it is decoded from the second data alone.

In various embodiments, the decoded content may be outputted.

In various embodiments, the decoded content may be outputted by at least one of a display and a loudspeaker.

In various embodiments, the position of the radio communication device may be determined.

In various embodiments, information representing the determined position may be transmitted to an information provider.

In various embodiments, it may be determined, whether a predetermined cell is available for the radio communication device. According to various embodiments, the most suitable combination of Radio Access technologies may be determined, for example such that the overall power consumption is minimized in the UE, or that the subscription cost for the user is minimized.

In various embodiments, information indicating whether the pre-determined cell is available for the radio communication device may be transmitted to an information provider.

In various embodiments, it may be determined whether data representing the content is received from a pre-determined cell.

In various embodiments, transmission of further data representing the content encoded using a further codec from a further cell may be requested from an information provider.

In various embodiments, a required quality of service of the content for the radio communication device may be determined.

In various embodiments, information representing the determined quality of service may be transmitted to an information provider.

FIG. 7 shows a flow diagram 700 illustrating a method for controlling an information provider in accordance with an embodiment. In 702, first data may be generated from a content using a first codec. In 704, second data may be generated from the content using a second codec. In 706, the first data may be transmitted using a first cell. In 708, the second data may be transmitted using a second cell.

The first cell and the second cell may be different. The first cell may be configured according to a first radio access technology. The second cell may be configured according to a second radio access technology.

According to various embodiments, a plurality of cells that is available for transmitting the first data and the second data to a radio communication device may be determined; and the first cell and the second cell may be selected from the plurality of cells based on a pre-determined criterion. For example, it may be determined, for a pre-determined radio communication device, which cells may provide radio services to the radio communication device, and one of these cells may be selected as the first cell and another one of these cells may be selected as the second cell.

According to various embodiments, the pre-determined criterion may include a criterion based on a coverage area of the first cell and of the second cell. For example, at least one of the first cell and the second cell may be chosen so as to cover an area with at least a pre-determined size. For example, this may ensure that even if the radio communication device moves over large distances, at least one data flow is constantly received.

According to various embodiments, the pre-determined criterion may include a criterion based on a transmission bandwidth of the first cell and of the second cell. For example, at least one of the first cell and the second cell may be chosen so as to be a cell that may provide a transmission bandwidth (in other words: a transmission speed) of at least a pre-determined amount. For example, this may ensure that a pre-determined amount of data arrives in every time interval at the radio communication device.

According to various embodiments, both a cell with at least a pre-determined coverage area (for example as the first cell) and a cell with at least a pre-determined transmission bandwidth (for example as the second cell) may be chosen. This may ensure both that even if the radio communication device moves over large distances, at least one data flow is constantly received, and that a pre-determined amount of data arrives in every time interval at the radio communication device.

In various embodiments, further data may be generated from the content encoded using a further codec, and the further data may be transmitted using a further cell. The further cell may be configured according to a further radio access technology.

In various embodiments, at least one of the first radio access technology and the second radio access technology may be a radio access technology of one of the following radio access technology families:
  a Short Range radio access technology family;
  a Metropolitan Area System radio access technology family;
  a Cellular Wide Area radio access technology family;
  a radio access technology family which includes a radio access technology in which the access to radio resources is provided in a random manner; and
  a radio access technology family which includes a radio access technology in which the access to radio resources is provided in a centrally controlled manner.

In various embodiments, at least one of the first radio access technology and the second radio access technology may be one of the following radio access technologies: a Bluetooth radio access technology, an Ultra Wide Band (UWB) radio access technology, a Wireless Local Area Network radio access technology (e.g. according to an IEEE 802.11 (e.g. IEEE 802.11n) radio communication standard)), IrDA (Infrared Data Association), Z-Wave and ZigBee, HiperLAN/2 ((HIgh PErformance Radio LAN; an alternative ATM-like 5 GHz standardized technology), IEEE 802.11a (5 GHz), IEEE 802.11g (2.4 GHz), IEEE 802.11n, IEEE 802.11VHT (VHT=Very High Throughput), e.g. IEEE 802.11ac for VHT below 6 GHz and IEEE 802.11ad for VHT at 60 GHz, a Worldwide Interoperability for Microwave Access (WiMax) (e.g. according to an IEEE 802.16 radio communication standard, e.g. WiMax fixed or WiMax mobile), WiPro, HiperMAN (High Performance Radio Metropolitan Area Network), IEEE 802.16m Advanced Air Interface, a Global System for Mobile Communications (GSM) radio access technology, a General Packet Radio Service (GPRS) radio access technology, an Enhanced Data Rates for GSM Evolution (EDGE) radio access technology, and/or a Third Generation Partnership Project (3GPP) radio access technology (e.g. UMTS (Universal Mobile Telecommunications System), FOMA (Freedom of Multimedia Access), 3GPP LTE (long term Evolution), 3GPP LTE Advanced (long term Evolution Advanced)), CDMA2000 (Code division multiple access 2000), CDPD (Cellular Digital Packet Data), Mobitex, 3G (Third Generation), CSD (Circuit Switched Data), HSCSD (High-Speed Circuit-Switched Data), UMTS (3G) (Universal Mobile Telecommunications System (Third Generation)), W-CDMA (UMTS) (Wideband Code Division Multiple Access (Universal Mobile Telecommunications System)), HSPA (High Speed Packet Access), HSDPA (High-Speed Downlink Packet Access), HSUPA (High-Speed Uplink Packet Access), HSPA+ (High Speed Packet Access Plus), UMTS-TDD (Universal Mobile Telecommunications System-Time-Division Duplex), TD-CDMA (Time Division-Code Division Multiple Access), TD-SCDMA (Time Division-Synchronous Code Division Multiple Access), 3GPP Rel. 8 (Pre-4G) (3rd Generation Partnership Project Release 8 (Pre-4th Generation)), UTRA (UMTS Terrestrial Radio Access), E-UTRA (Evolved UMTS Terrestrial Radio Access), LTE Advanced (4G) (long term Evolution Advanced (4th Generation)), cdmaOne (2G), CDMA2000 (3G) (Code division multiple access 2000 (Third generation)), EV-DO (Evolution-Data Optimized or Evolution-Data Only), AMPS (1G) (Advanced Mobile Phone System (1st Generation)), TACS/ETACS (Total Access Communication System/Extended Total Access Communication System), D-AMPS (2G) (Digital AMPS (2nd Generation)), PTT (Push-to-talk), MTS (Mobile Telephone System), IMTS (Improved Mobile Telephone System), AMTS (Advanced Mobile Telephone System), OLT (Norwegian for Offentlig Landmobil Telefoni, Public Land Mobile Telephony), MTD (Swedish abbreviation for Mobiltelefonisystem D, or Mobile telephony system D), Autotel/PALM (Public Automated Land Mobile), ARP (Finnish for Autoradiopuhelin, "car radio phone"), NMT (Nordic Mobile Telephony), Hicap (High capacity version of NTT (Nippon Telegraph and Telephone)), CDPD (Cellular Digital Packet Data), Mobitex, DataTAC, iDEN (Integrated Digital Enhanced Network), PDC (Personal Digital Cellular), PHS (Personal Handy-phone System), WiDEN (Wideband Integrated Digital Enhanced Network), iBurst, and Unlicensed Mobile Access (UMA, also referred to as 3GPP Generic Access Network, or GAN standard)).

In various embodiments, the data may be transmitted using at least one of unicast, multicast and broadcast.

In various embodiments, the first radio access technology and the second radio access technology may be different.

In various embodiments, the first radio access technology and the second radio access technology may be identical.

In various embodiments, the first codec and the second codec may be multiple description codecs, as will be explained in more detail below.

In various embodiments, the first codec and the second codec may be video codecs.

In various embodiments, the first codec and the second codec may be audio codecs.

In various embodiments, the first codec and the second codec may be configured so that a decoder can decode the first data to obtain the content.

In various embodiments, the first codec and the second codec may be configured so that a decoder can decode the second data to obtain the content.

In various embodiments, the first codec and the second codec may be configured so that a decoder can decode a combination of the first data and second data to obtain the content.

In various embodiments, the first codec and the second codec may be configured so that a decoder can decode the first data to obtain the content; where the first codec and the second codec may be further configured so that the same decoder can decode the second data to obtain the content; and wherein the first codec and the second codec may be further configured so that the same decoder can decode a combination of the first data and second data to obtain the content.

In various embodiments, the quality of the decoded content may be higher when it is decoded from the combined first data and second data compared to when it is decoded from the first data alone or when it is decoded from the second data alone.

In various embodiments, information representing a position of a radio communication device may be received.

In various embodiments, it may be determined whether a pre-determined cell is available for the radio communication device based on the received position information. According to various embodiments, the most suitable combination of Radio Access technologies may be determined, for example such that the overall power consumption is minimized in the UE, or that the subscription cost for the user is minimized.

According to various embodiments, the most used Radio Access Technologies (RAT) in a given area may be analyzed, a number of redundant flows (for example a number of redundant data) may be created and broadcasted following the level of RAT acceptance by the users in a given area.

In various embodiments, coding parameters for at least one of the first codec and the second codec may be determined, based on the determination whether a pre-determined cell is available for the radio communication device.

In various embodiments, information indicating whether a pre-determined cell is available for a radio communication device may be received.

In various embodiments, coding parameters for at least one of the first codec and the second codec may be determined, based on the received information indicating whether a pre-determined cell is available for the radio communication device.

In various embodiments, a request for transmission of further data representing the content encoded using a further codec using a further cell may be received from a radio communication device.

In various embodiments, information representing the required quality of service of the content for a radio communication device may be received.

In various embodiments, coding parameters for at least one of the first codec and the second codec may be determined, based on the received information representing the required quality of service.

In various embodiments, it may be determined whether a bearer for a pre-determined cell is available.

In various embodiments, coding parameters for at least one of the first codec and the second codec may be determined, based on the determination whether a bearer for a pre-determined cell is available.

In various embodiments, the data may be generated by encoding the content.

In various embodiments, data representing the content encoded using a codec may be stored, and the data may be generated by retrieving data from the storage.

Figure 8:
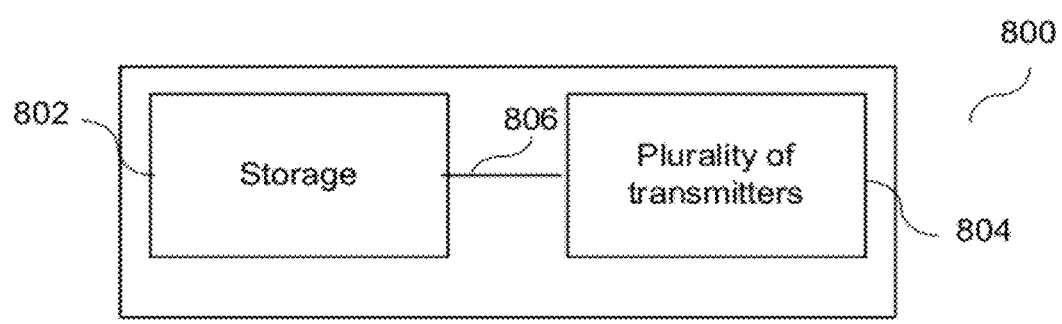
FIG. 8 shows an information provider in accordance with an embodiment.

FIG. 8 shows an information provider 800 in accordance with an embodiment. The information provider 800 may include a storage 802 configured to store a plurality of files, each file representing the same content; and a plurality of transmitters 804 configured to transmit the plurality of files, each file using one of a plurality of radio access technologies. The storage 802 and the plurality of transmitters 804 may be coupled with each other, e.g. via an electrical connection 806 such as e.g. a cable or a computer bus or via any other suitable electrical connection to exchange electrical signals.

According to various embodiments, Multicast/Broadcast Services (MBS) for example for the following conditions may be provided, as will be explained below: the user may be assumed to be in a heavily heterogeneous environment (for example, multiple Radio Access Technologies (RATs) may be accessible in a given geographic area), and the user may be able to operate multiple RATs simultaneously, for example the user may be equipped with a terminal that supports the simultaneous operation of 3GPP LTE and WiFi.

According to various embodiments, the user may exploit an instantaneous RAT context such that it may receive an instantaneous optimum QoS (Quality of Service). This QoS may vary greatly over time, in particular if the user is moving. The general principle will be illustrated with reference to the following figures.

Figure 9:
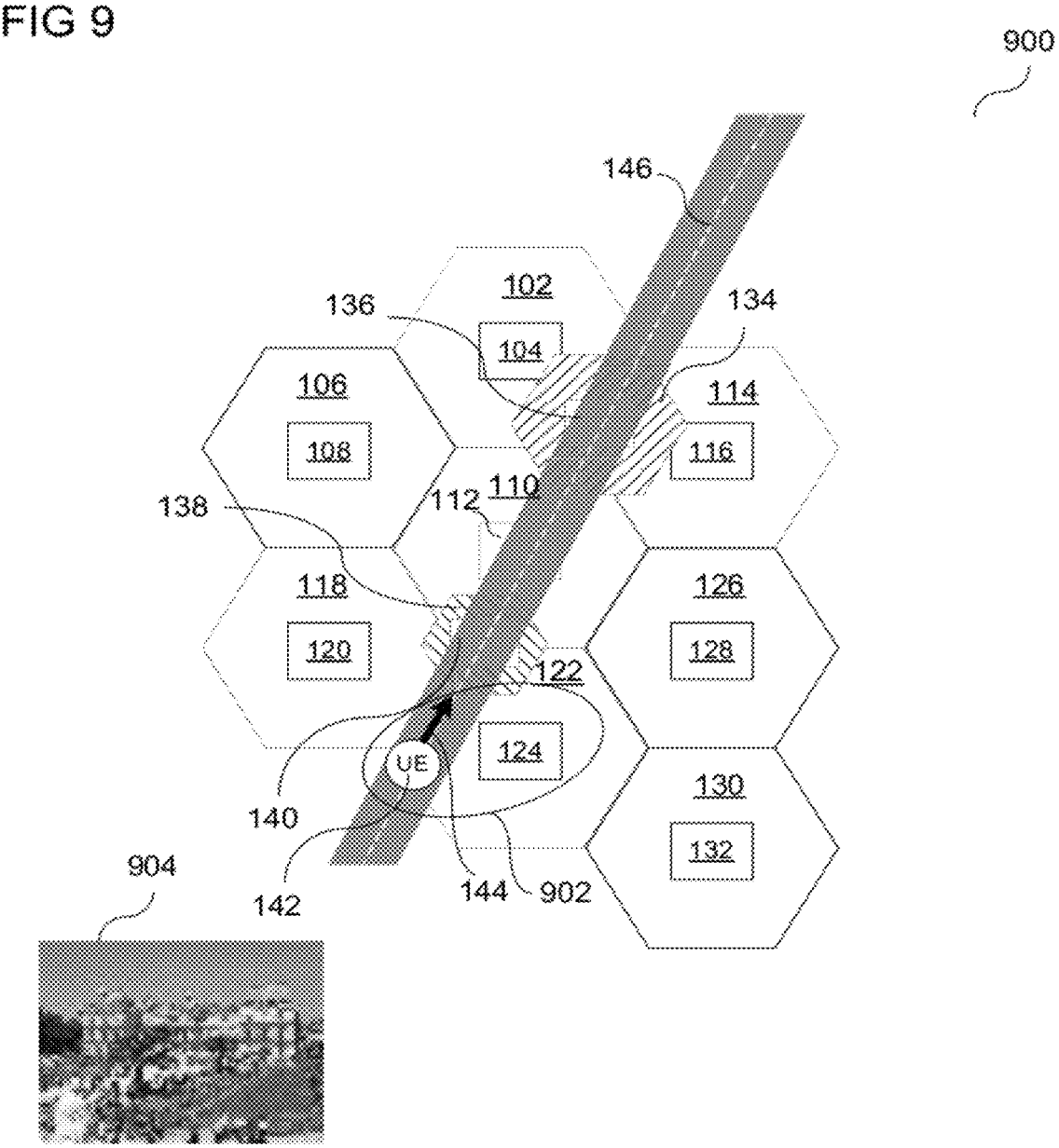
FIG. 9 shows an area, in which a heterogeneous broadcast/multicast service in accordance with an embodiment is provided.

FIG. 9 shows an area 900, in which a heterogeneous broadcast/multicast service (HBMS) in accordance with an embodiment, is provided. For example, a user as illustrated in FIG. 9 accessing a video service, may have at a first time only a link to the nearest eNB.

The area 900 may be the area 100 of FIG. 1, wherein the UE 142 may receive data only from the sixth standard eNB 124 in the sixth 3GPP LTE macro-cell 122, as indicated by ellipse 902. For example, the UE 142 may be located at the cell edge of the sixth cell 122. As a result, the UE may obtain only low quality of service at the cell edge and the quality of a video service may be low, as indicated by a poor quality image 904.

Figure 10:
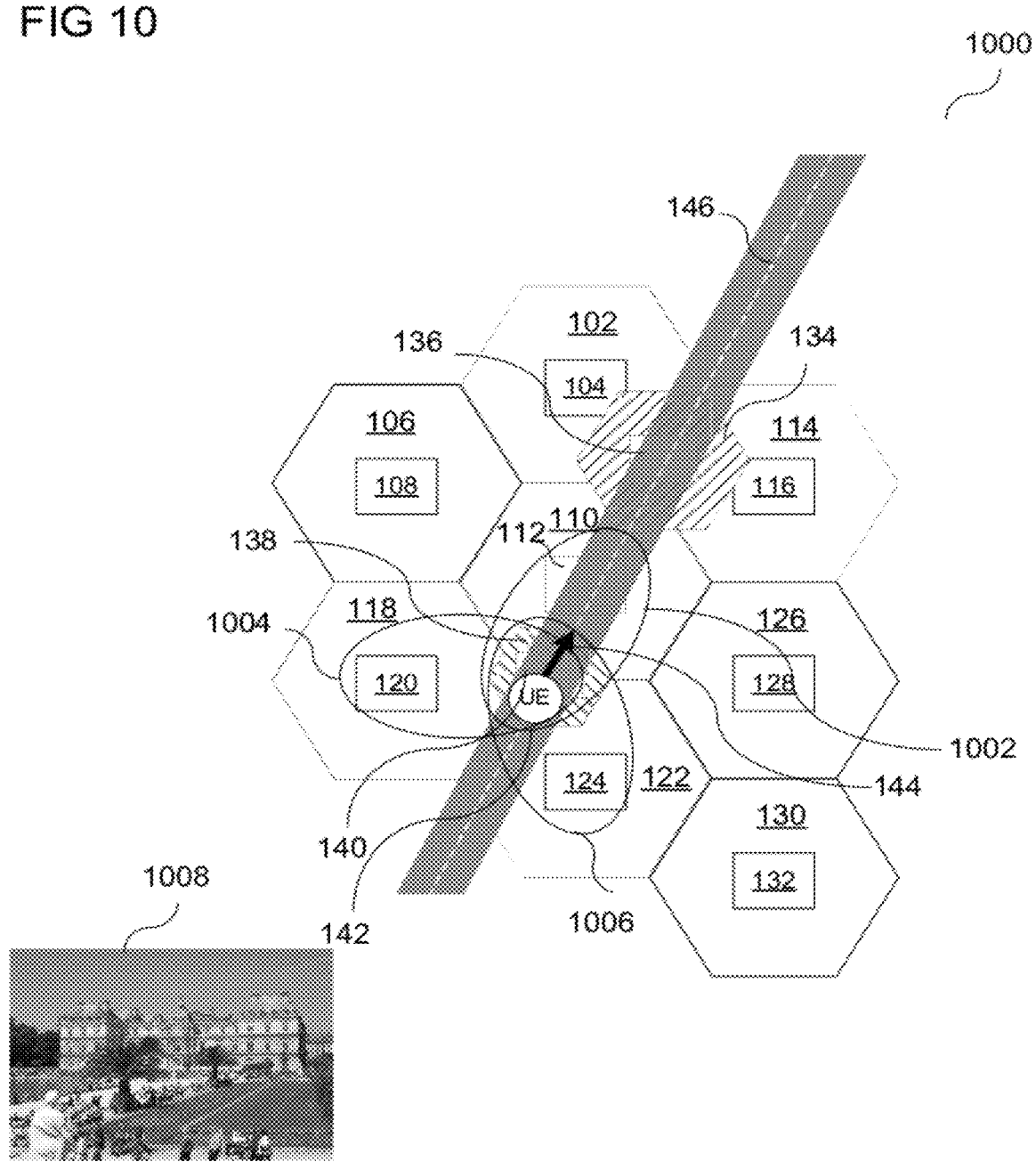
FIG. 10 shows an area, in which a heterogeneous broadcast/multicast service in accordance with an embodiment is provided.

FIG. 10 shows an area 1000, in which a heterogeneous broadcast/multicast service in accordance with an embodiment is provided. The area 1000 may be similar to the area 100 of FIG. 1. The UE 142 may have moved to another location on the road 146, and may now receive data from the third standard eNB 112 in the third 3GPP LTE macro-cell 110 as indicated by a first ellipse 1002, from the fifth standard eNB 120 in the fifth 3GPP LTE macro-cell 122 as indicated by a second ellipse 1004, from the sixth standard eNB 124 in the sixth 3GPP LTE macro-cell 122, as indicated by third ellipse 1006 and from the WiFi base station 140 in the WiFi cell 138 as indicated by being illustrated directly in the WiFi cell 138. As a result, the UE may receive data from all of these cells, and may combine the data, to increase the quality of the received data. For example, the user may obtain good video quality of service by combining the signals flows from the multiple sources, as indicated by a good quality image 1008.

For example, as soon as the user enters the WiFi coverage, the link to multiple RATs may be established simultaneously (3x eNB, 1x WiFi), which may greatly improve the video quality.

According to various embodiments, a user may decode the original data by any combination of the streams provided by the source, as will be illustrated below.

Figure 11:
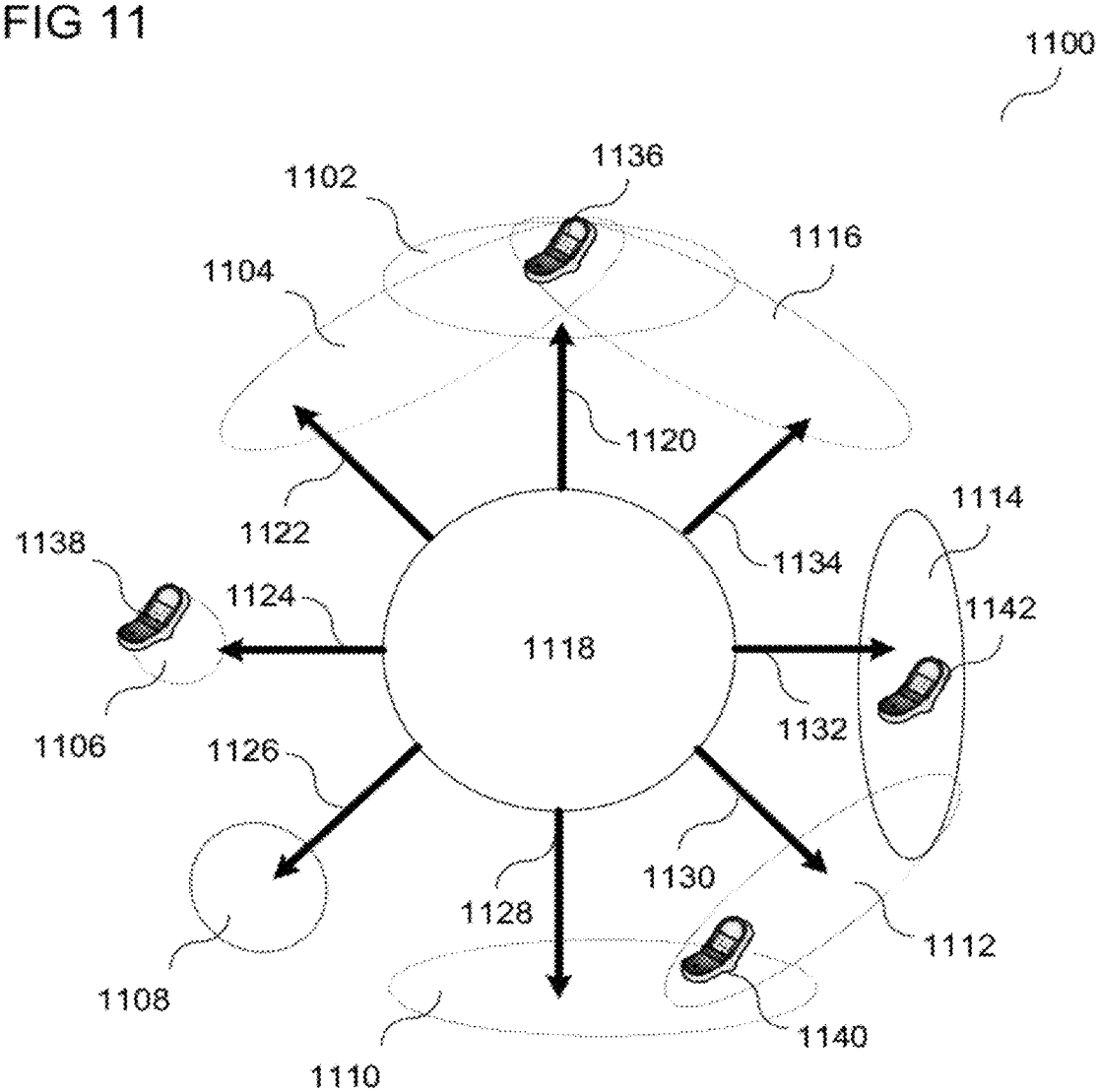
FIG. 11 shows a diagram illustrating a plurality of data streams in accordance with an embodiment.

FIG. 11 shows a diagram 1100 illustrating a plurality of data streams in accordance with an embodiment.

According to various embodiments, any UE may combine any number of available streams (for example, each stream may be transported on any available RAT). A UE accessing streams transported by distinct RATs may desire to operate the corresponding decoders/transceivers simultaneously.

A network (NW) 1118 may be distributing various streams enabling UEs to decode the source data by building on any combination of these streams. Depending on the combined throughput provided by these streams, the service quality may be high/low.

For example, a first stream 1120 may be provided to a first WiMAX cell 1116 and to a first 3GPP LTE cell 1102 and a second 3GPP LTE cell 1104; a second stream 1120 may be provided to the second 3GPP LTE cell 1104; a third stream 1120 may be provided to a first WiFi cell 1106 of a first provider; a fourth stream 1120 may be provided to a second WiFi cell 1108 of a first provider; a fifth stream 1120 may be provided to a first WiFi cell 1110 of a second provider; a sixth stream 1120 may be provided to a second WiFi cell 1112 of a second provider; a seventh stream 1120 may be provided to a second WiMAX cell 1114; and an eighth stream 1120 may be provided to the first WiMAX cell 1116. A For example, a first UE 1136 may receive the first stream 1120 from the first 3GPP LTE cell 1102, the second stream 1122 from the second 3GPP LTE cell 1104 and the eighth stream 1134 from the first WiMAX cell 1116; a second UE 1138 may receive the third stream 1124 from the first WiFi cell 1106 of the first provider; a third UE 1140 may receive the fifth stream 1128 from the first WiFi cell 1110 of the second provider and the sixth stream 1130 from the second WiFi cell 112 of the second provider; and a fourth UE 1142 may receive the seventh stream 1132 from the second WiMAX cell 1114. The fourth stream 1126 may be inactive, because no UE is receiving it.

According to various embodiments, methods and devices may be provided that may provide the behavior of the UE accessing such heterogeneous MBS services as illustrated above. According to various embodiments, modification on the network side may be provided to provide such a behavior.

According to various embodiments, methods and devices for the efficient distribution of an identical source signal over various heterogeneous nodes applying distinct (redundant) encoding may be provided. According to various embodiments, the inclusion of such a functionality into cellular systems, for example into 3GPP LTE, may be provided.

According to various embodiments, methods and devices on the Source Coding and system management side may be provided for the heterogeneous MBS concept illustrated above.

According to various embodiments, on the system level, distinct (for example redundant) versions of the same source data may be transmitted by various nodes. According to various embodiments, the efficient distribution of an identical source signal over various heterogeneous nodes applying distinct (for example redundant) encoding may be provided. According to various embodiments, the term 'node' may include various embodiments of base stations or access points that may be not co-located at the same site. According to various embodiments, in the context of LTE-Advanced, various devices and methods according to various embodiments may be applied to Carrier Aggregation methods. According to various embodiments, in Carrier Aggregation, a number of non-adjacent frequency bands may be used jointly to provide a UE with high data rate services, while said frequency bands may be used by the same base station (in other words: the same node) in a well coordinated manner.

According to various embodiments, for source coding, the user may be able to exploit any combination of distinct redundant flows of the same original signal. According to various embodiments, a "Multiple Description Coding (MDC)" approach may be applied to the codecs.

Figure 12:
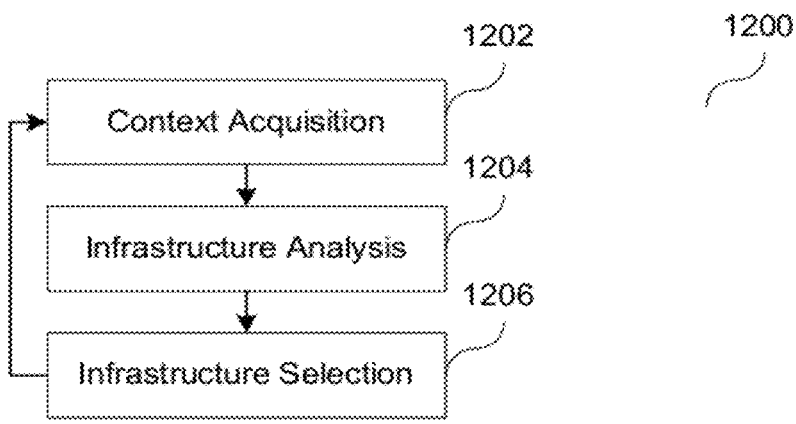
FIG. 12 shows a flow diagram illustrating basic network tasks for provision of heterogeneous broadcast/multicast services in accordance with an embodiment.

FIG. 12 shows a flow diagram 1200 illustrating basic network tasks for provision of heterogeneous broadcast/multicast services in accordance with an embodiment. According to various embodiments, for the provision of heterogeneous MBS services, the following tasks may be repeatedly performed: in 1202, context acquisition may be performed, for example the UE positions may be identified; in 1204, infrastructure analysis may be performed, for example, nodes covering a UE, for which the UE may be able to activate corresponding receivers, may be identified, for example also taking UE preferences into account; and in 1206, infrastructure selection may be performed, for example, most suitable nodes for transmitting distinct redundant flows of the identical source signal may be selected According to various embodiments, the identification of position of the UE may be UE based (and network assisted) or network based (and UE assisted).

According to various embodiments, on UE-demand addition of heterogeneous MBS flows may be provided. According to various embodiments, an additional heterogeneous MBS flow may be requested by UE devices. For example, if a UE arrives in the coverage area of a novel node which is not contributing to the QoS of a given original signal, the user may request the network to also distribute a corresponding (for example additional redundant) flow over such a node. For example, upon reception of the corresponding request from the UE, the network may decide upon the usage of the proposed node. For example, if it will be added to the list of distribution nodes of the heterogeneous MBS flows in the future, a corresponding indicator message may be distributed to all relevant UE devices and the data rate may be adapted correspondingly (for example taking the capabilities of the concerned node into account, their distance to the node, and the like).

According to various embodiments, in order to include the heterogeneous MBS support in 3GPP LTE, the Core Network Architecture may be extended, as will be explained below.

Figure 13:
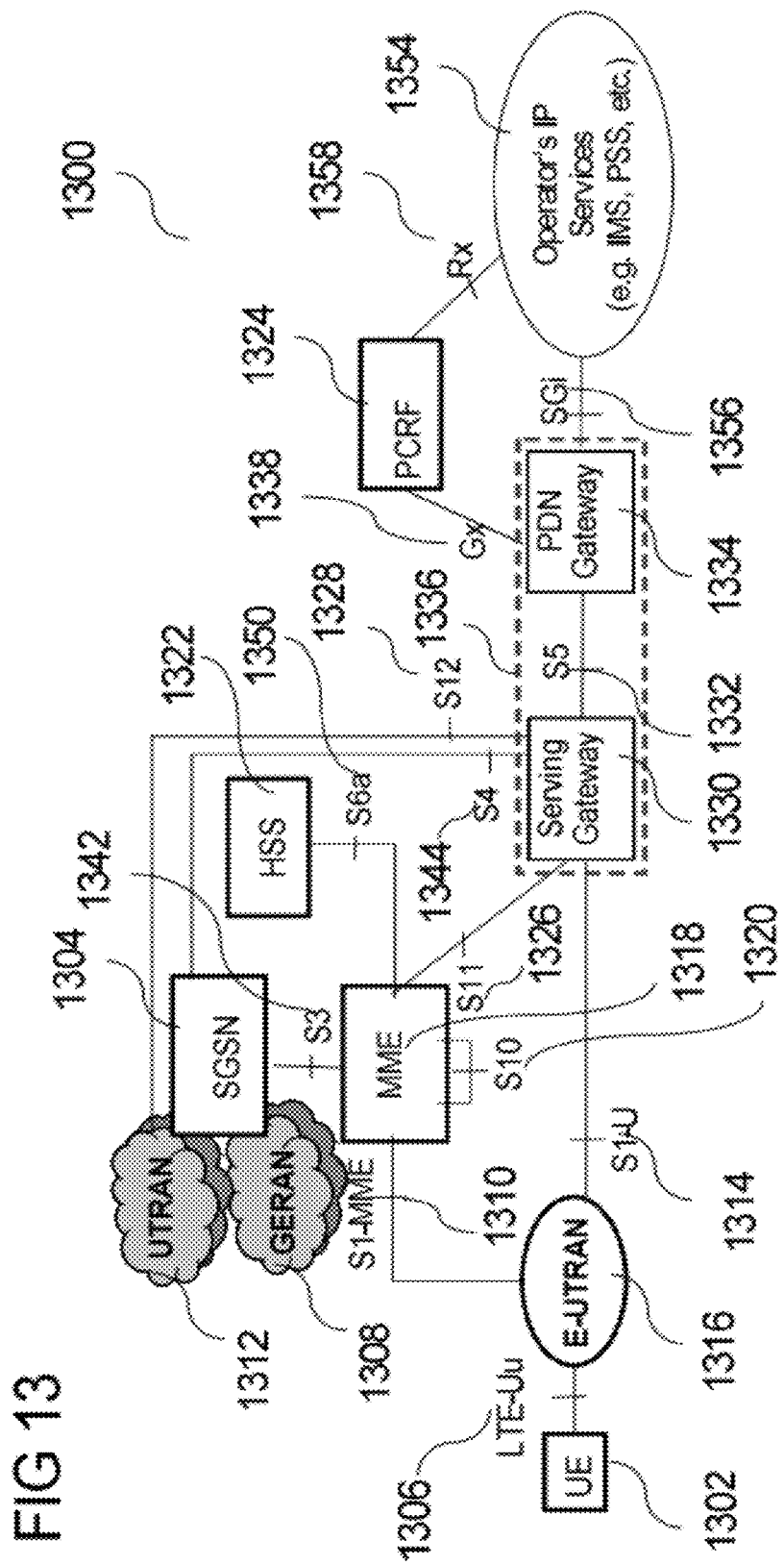
FIG. 13 shows a network architecture in accordance with an embodiment.

FIG. 13 shows a network architecture 1300 in accordance with an embodiment. The network architecture 1300 may be a Non-Roaming 3GPP Core Network Architecture with three different Radio Access Networks (RANs). The 3GPP Network Architecture 1300 may include an Evolved Packet Core (EPC) and a General Packet Radio Service (GPRS) Core, which may be connected with each other by various interfaces, as will be described in more detail below. As shown in FIG. 13, the GPRS Core may include a Serving GPRS Support Node (SGSN) 1304, which may be coupled to different Radio Access Networks, such as e.g. to a GSM EDGE Radio Access Network (GERAN) 1308 (which may also be referred to as 2G or 2.5G) via a Gb interface, and/or to a UMTS Terrestrial Radio Access Network (UTRAN) 1312 via an Iu interface. In an embodiment, UTRAN may stand for UMTS Terrestrial Radio Access Network and may be a collective term for the NodeBs and Radio Network Controllers (RNCs) which make up the UMTS radio access network. This communications network, commonly referred to as 3G, may carry many traffic types from real-time Circuit Switched to IP based Packet Switched. The UTRAN 1312 may include at least one NodeB that may be connected to at least one Radio Network Controller (RNC). An RNC may provide control functionalities for one or more NodeB(s). A NodeB and an RNC may be the same device, although typical implementations may have a separate RNC located in a central location serving multiple NodeBs. An RNC together with its corresponding NodeBs may be called the Radio Network Subsystem (RNS). There may be more than one RNS provided per UTRAN.

Furthermore, in an embodiment, the following entities or components may be provided in the general 3GPP Network Architecture 1300:

an evolved UMTS Terrestrial Radio Access Network (E-UTRAN) 1316;

a trusted non-3GPP Internet Protocol (IP) access network and connected therewith trusted non-3GPP Internet Protocol (IP) devices, in other words, trusted non-3GPP devices which may access the EPC using the Internet Protocol stack;

a Wireless Local Area network (WLAN) 3GPP Internet Protocol (IP) access network and connected therewith Wireless Local Area network (WLAN) 3GPP Internet Protocol (IP) devices, in other words, WLAN 3GPP devices which may access the EPC using the Internet Protocol stack;

a Home Subscriber Server (HSS) 1322; and a Policy and Charging Rules Function (PCRF) entity 1324.

E-UTRAN may be understood as being the new 3GPP Radio Access Network for LTE (3.9G) that is currently being worked on. The proposed E-UTRA air interface may use OFDMA for the downlink transmission direction (tower to handset) and Single Carrier FDMA (SC-FDMA) for the uplink transmission direction (handset to tower). It may employ MIMO (Multiple-Input Multiple-Output) with a plurality of antennas, e.g. with up to four antennas per station. The use of OFDM (Orthogonal Frequency Division Multiplexing) may enable E-UTRA to be much more flexible in its use of spectrum than the older CDMA based systems, such as e.g. UTRAN. OFDM may have a link spectral efficiency greater than CDMA, and when combined with modulation formats such as 64QAM (Quadrature Amplitude Modulation), and techniques as MIMO, E-UTRA may be more efficient than W-CDMA (Wideband CDMA) with HSDPA (High Speed Downlink Packet Access) and HSUPA (High Speed Uplink Packet Access).

Furthermore, as will be described in more detail below, the EPC may include a Mobility Management Entity (MME) 1318 and a Serving Gateway (S-GW) 1330 (in FIG. 13 shown as separate devices, however, the MME 1318 and the S-GW 1330 may also be implemented in one combined entity), a 3GPP Anchor entity and an SAE (System Architecture Evolution) Anchor entity.

In an embodiment, the E-UTRAN 1316 may be connected to the Serving Gateway 1330 via an S1-U interface 1314. In an embodiment, the E-UTRAN 1316 may be connected to the MME 1318 via an S1-MME interface 1310.

In an embodiment, a UE 1302 may be connected to the E-UTRAN 1316 by an LTE-Uu interface 1306.

Furthermore, the trusted non-3GPP IP entity may be connected to the SAE Anchor entity via an S2a interface. In an embodiment, the S2a interface may be based on the Proxy Mobile IPv6 (PMIP) and in order to support accesses that do not support PMIP also Mobile IPv4.

The WLAN entity may include an ePDG (Evolved Packet Data Gateway) and a WLAN access network. The ePDG may be connected to the SAE Anchor entity via an S2b interface, which may provide the user plane with related control and mobility support between ePDG and a Packet Data Network (PDN) Gateway 1334 of the EPC. In an embodiment, the S2b interface may be based on the Proxy Mobile IPv6 (PMIP).

Furthermore, the SGSN 1304 may be connected to the MME 1318 in the EPC via an S3 interface 1342, which may provide and enable a user and bearer information exchange for inter 3GPP access network mobility in idle and/or active state. In an embodiment, the S3 interface 1342 may be based on the GPRS tunneling protocol (GTP) and the Gn interface as it may be provided between SGSNs. The SGSN 1304 may further be connected to the 3GPP Anchor entity via an S4 interface, which may provide the user plane with related control and mobility support between the GPRS Core and the 3GPP Anchor function of the S-GW 1330 and may be based on the GTP protocol and the Gn reference point as provided between SGSN 1304 and GGSN (GPRS Support Node).

The MME S-GW may be connected to the 3GPP Anchor entity via an S5a interface and the 3GPP Anchor entity may be connected to the SAE Anchor entity via an S5b interface.

Furthermore, the HSS 1322 may be connected to the MME 1318 via an S6a interface 1350, which may provide or enable transfer of subscription and authentication data for authenticating/authorizing user access to the evolved system (AAA interface) between the MME 1318 and the HSS 1322.

The PCRF 1324 may be connected to the EPC via an S7 interface, which may provide transfer of Quality of Service (QoS) policy and charging rules from the PCRF 1324 to the Policy and Charging Enforcement Function (PCEF) in an PDN Gateway 1334 of the EPC. In an embodiment, the S7 interface may be based on an Gx interface 1338.

IP services 1354 such as e.g. (3G) IP Multimedia Subsystem (IMS), (3G) Packet Switches Streaming (PSS), etc., may be provided via an SGi interface 1356 to the SAE Anchor entity and/or via an Rx interface 1358 to the PCRF 1324. In an embodiment, the SGi interface 1356 may be the interface between the PDN Gateway 1334 and the packet data network. The packet data network may be an operator external public or private packet data network or an intra operator packet data network, e.g. for provision of IP services such as e.g. of IMS. The SGi interface 1356 may correspond to the Gi and Wi interfaces and support any 3GPP or non-3GPP access. The Rx interface 1358 may be the interface between the IP services and the PCRF 1324.

In various embodiments, the MME may be connected to other MMEs by an S10 interface 1320 for MME relocation and MME to MME information transfer.

In various embodiments, the MME 1318 may be connected to the Serving Gateway 1330 by an S11 interface 1326.

In various embodiments, the Serving Gateway 1330 may be connected to the PDN gateway 1334 by an S5 interface 1332. In various embodiments, the Serving Gateway 1330 may be connected to the SGSN 1304 by an S4 interface 1344. In various embodiments, the Serving Gateway 1330 may be connected to the UTRAN 1312 by an S12 interface 1328.

In various embodiments, the Serving Gateway (SGW) 1330 and the PDN Gateway (PGW) 1334 may be one functional entity, as indicated by dashed box 1336.

According to various embodiments, the EPC may include as its subcomponents the MME 1318, the SGW 1330, and the PGW 1334.

According to various embodiments, the MME (Mobility Management Entity) 1318 may be the key control-node for the LTE access-network. It may be responsible for idle mode UE tracking and paging procedure including retransmissions. It may be involved in the bearer activation/deactivation process and may also be responsible for choosing the SGW 1330 for a UE 1302 at the initial attach and at time of intra-LTE handover involving Core Network (CN) node relocation. It may be responsible for authenticating the user (by interacting with the Home Subscriber Server (HSS 1322)). The Non-Access Stratum (NAS) signaling may terminate at the MME 1318 and it may also be responsible for generation and allocation of temporary identities to UEs. It may check the authorization of the UE to camp on the service provider's Public Land Mobile Network (PLMN) and may enforce UE roaming restrictions. The MME 1318 may be the termination point in the network for ciphering/integrity protection for NAS signaling and may handle the security key management. Lawful interception of signaling may also be supported by the MME

1318. The MME 1318 also may provide the control plane function for mobility between LTE and 3GPP technologies with the S3 interface 1342 terminating at the MME 1318 from the SGSN 1304. The MME 1318 may terminate the S6a interface 1350 towards the home HSS 1322 for roaming UEs.

The SGW (Serving Gateway) 1330 may route and forward user data packets, while also acting as the mobility anchor for the user plane during inter-eNodeB handovers and as the anchor for mobility between LTE and other 3GPP technologies (for example terminating S4 interface 1344 and relaying the traffic between 2G/3G systems and PGW 1334). For idle state UEs, the SGW 1330 may terminate the DL (downlink) data path and may trigger paging when DL data arrives for the UE. It may manage and store UE contexts, for example parameters of the IP bearer service, network internal routing information. It may also perform replication of the user traffic in case of lawful interception.

According to various embodiments, the PGW (PDN Gateway) 1334 may provide connectivity from the UE 1302 to external packet data networks by being the point of exit and entry of traffic for the UE 1302. A UE 1302 may have simultaneous connectivity with more than one PGW 1334 for accessing multiple PDNs. The PGW 1334 may perform policy enforcement, packet filtering for each user, charging support, lawful Interception and packet screening. The PGW may further act as the anchor for mobility between 3GPP and non-3GPP technologies such as WiMAX and 3GPP2 (CDMA 1X and EvDO (Evolution-Data Optimized)).

Figure 14:
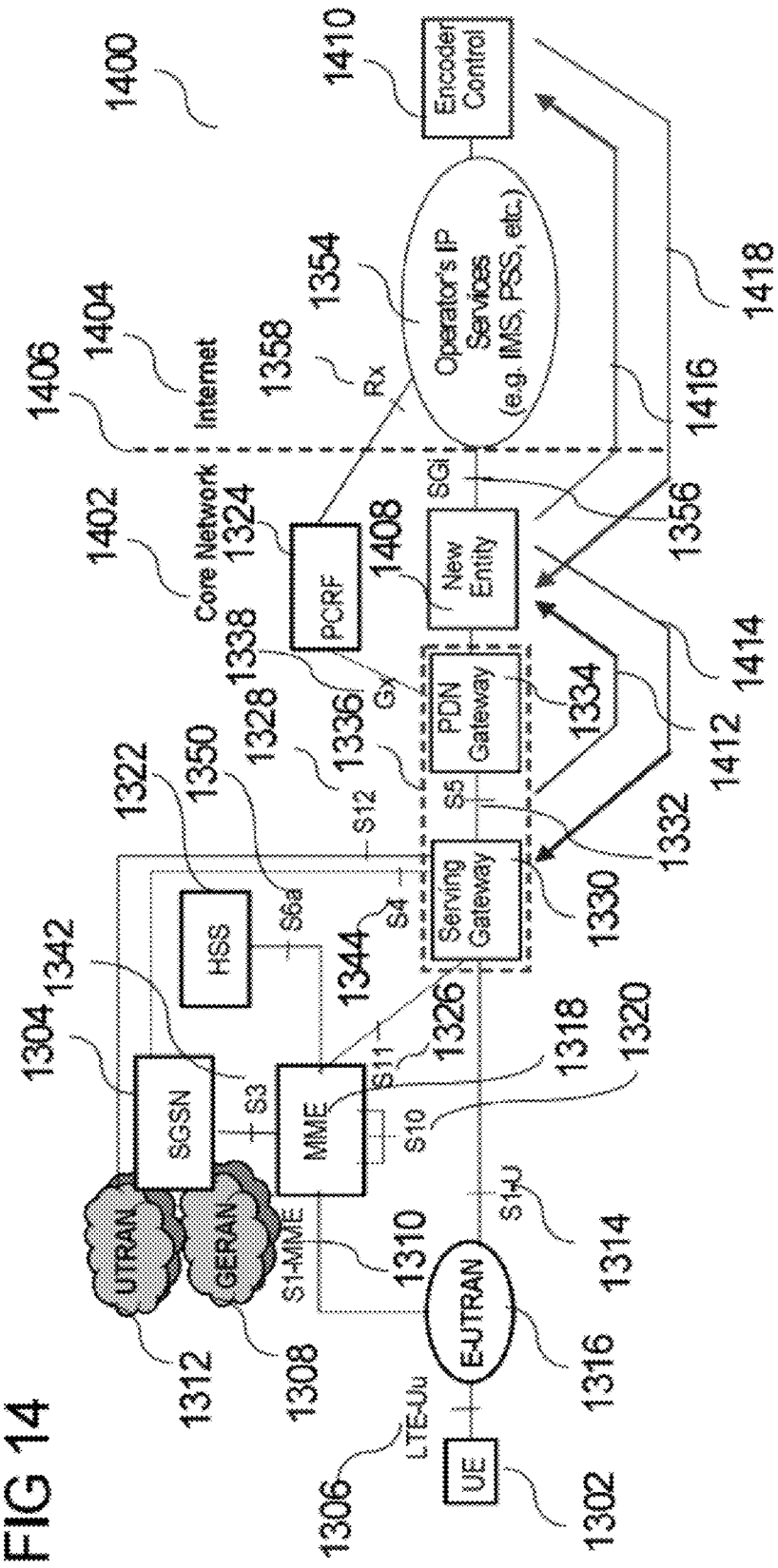
FIG. 14 shows a network architecture in accordance with an embodiment.

FIG. 14 shows a network architecture 1400 in accordance with an embodiment. Various parts of the network architecture 1400 may be the same as or similar to the parts of the network architecture 1300 of FIG. 13, and the same reference signs may be used for those parts and duplicate description may be omitted.

In the network architecture 1400, three different RANs (Radio Access Networks; for example UTRAN 1312, GERAN 1308, and E-UTRAN 1316), a MNO's (Mobile Network Operator) core network and the SGi interface 1356 connecting the MNO's domain 1402 to the Internet 1404 (which may also be referred to as IP cloud), as indicated by a dashed line 1406, are shown.

According to various embodiments, a new entity 1408 may be provided. The new entity 1408 may analyze and adapt (for example transcode) the u-plane (user plane) data stream according to the needs and/or capabilities of the RATs in the various RANs, as will be explained in more detail below.

According to various embodiments, an encoder control 1410 (for example an encoder controller 1410 or an encoder control entity 1410, for example a u-plane encoder 1410) may be provided. The encoder control 1410 may be assigned to the source encoding engine residing somewhere in the IP cloud 1404. It may not be present in all cases; for example it may not be present when the u-plane data is already encoded and stored on a server outside the MNO's domain. However, it may be present, when the encoding of data is an ongoing process at the time the data is consumed by the UE 1302 (for example in the streaming case).

According to various embodiments, the new entity 1408 and/or the encoder control 1410 may be (or may be a part of) the information provider as has been explained above.

According to various embodiments, various transactions as will be explained below may be provided between the New Entity 1408 and the Serving Gateway 1336/PDN Gateway 1334 functional entity 1336, and between the New Entity 1408 and the Encoder Control functional module 1410 at the source (for example in the Internet 1404).

According to various embodiments, in a first transaction, as indicated by a first arrow 1412, the New Entity 1408 may receive QoS related information about (for example currently active or theoretically possible) bearer configurations in E-UTRAN 1316, UTRAN 1312, and GERAN 1308.

According to various embodiments, in a second transaction, as indicated by a second arrow 1414, the New Entity 1408 may request pre-determined bearer configurations for a number of different bearers in various RATs, such as E-UTRAN 1316, UTRAN 1312, and GERAN 1308. According to various embodiments, this request may be based on a u-plane coding analysis done by the New Entity 1408 itself, and/or on information received from the u-plane encoder (residing outside of the MNO's domain).

According to various embodiments, in a third transaction, as indicated by a third arrow 1416, the New Entity 1408 may request a pre-determined coding scheme from the u-plane encoder or from the Encoder Control entity 1410 assigned to the u-plane encoder. According to various embodiments, this request may be based on various pieces of QoS related information received from the P-GW (PDN Gateway) 1334/S-GW (Serving Gateway) 1330 pertaining to a number of (currently active or theoretically possible) bearer configurations in various RATs, such as E-UTRAN 1316, UTRAN 1312, and GERAN 1308 or pertaining to a number of different Component Carriers (in case of LTE-Advanced).

According to various embodiments, in a fourth transaction, as indicated by a fourth arrow 1418, the New Entity 1408 may receive encoding information from the u-plane encoder or the Encoder Control entity 1410 assigned to the u-plane encoder.

Figure 15:
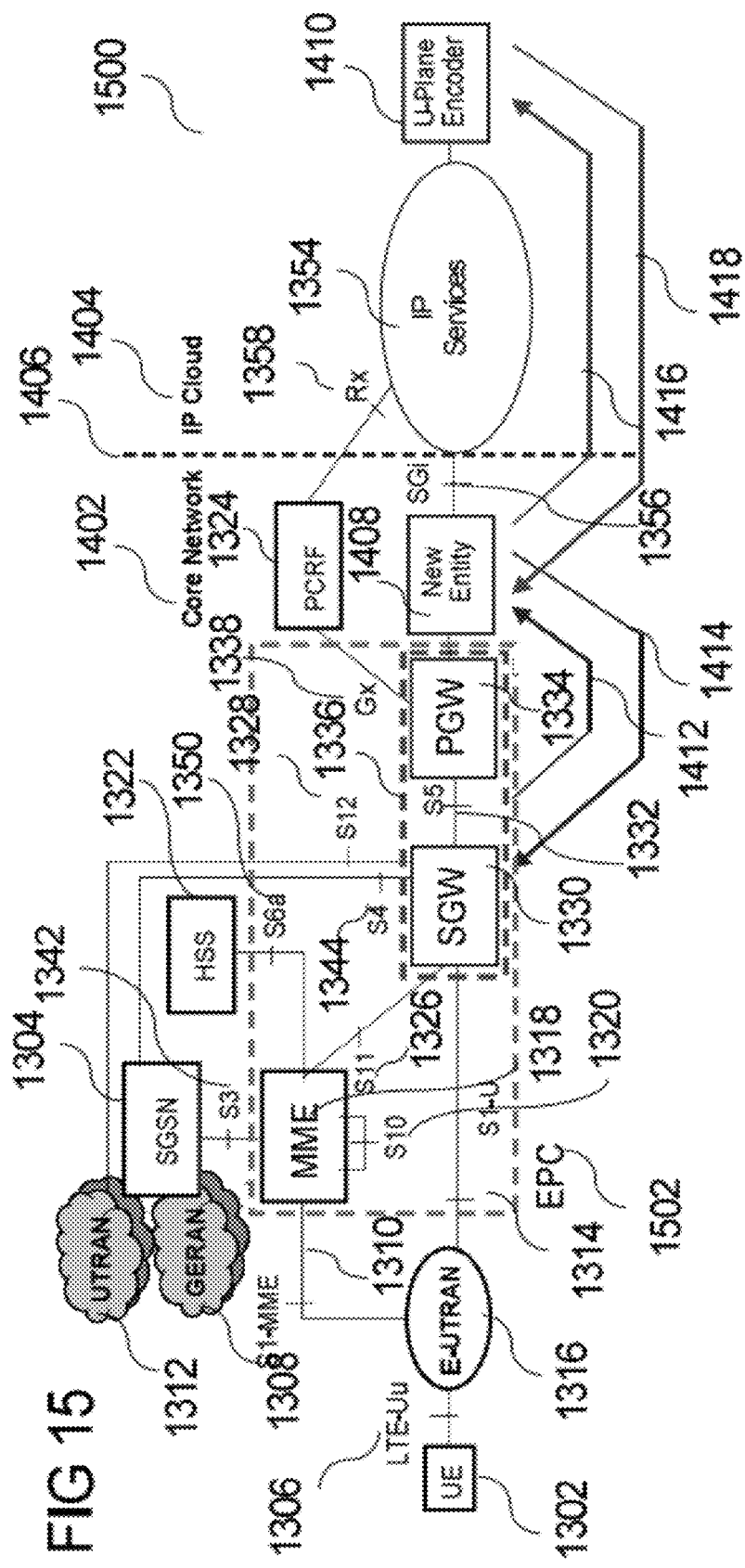
FIG. 15 shows a network architecture in accordance with an embodiment.

FIG. 15 shows a network architecture 1500 in accordance with an embodiment. Various parts of the network architecture 1500 may be the same as or similar to the parts of the network architecture 1400 of FIG. 14, and the same reference signs may be used for those parts and duplicate description may be omitted. In FIG. 15, the EPC (Evolved Packet Core) is shown as a box 1502 with its three main sub components MME 1318, SGW 1330, and PGW 1334.

Figure 16:
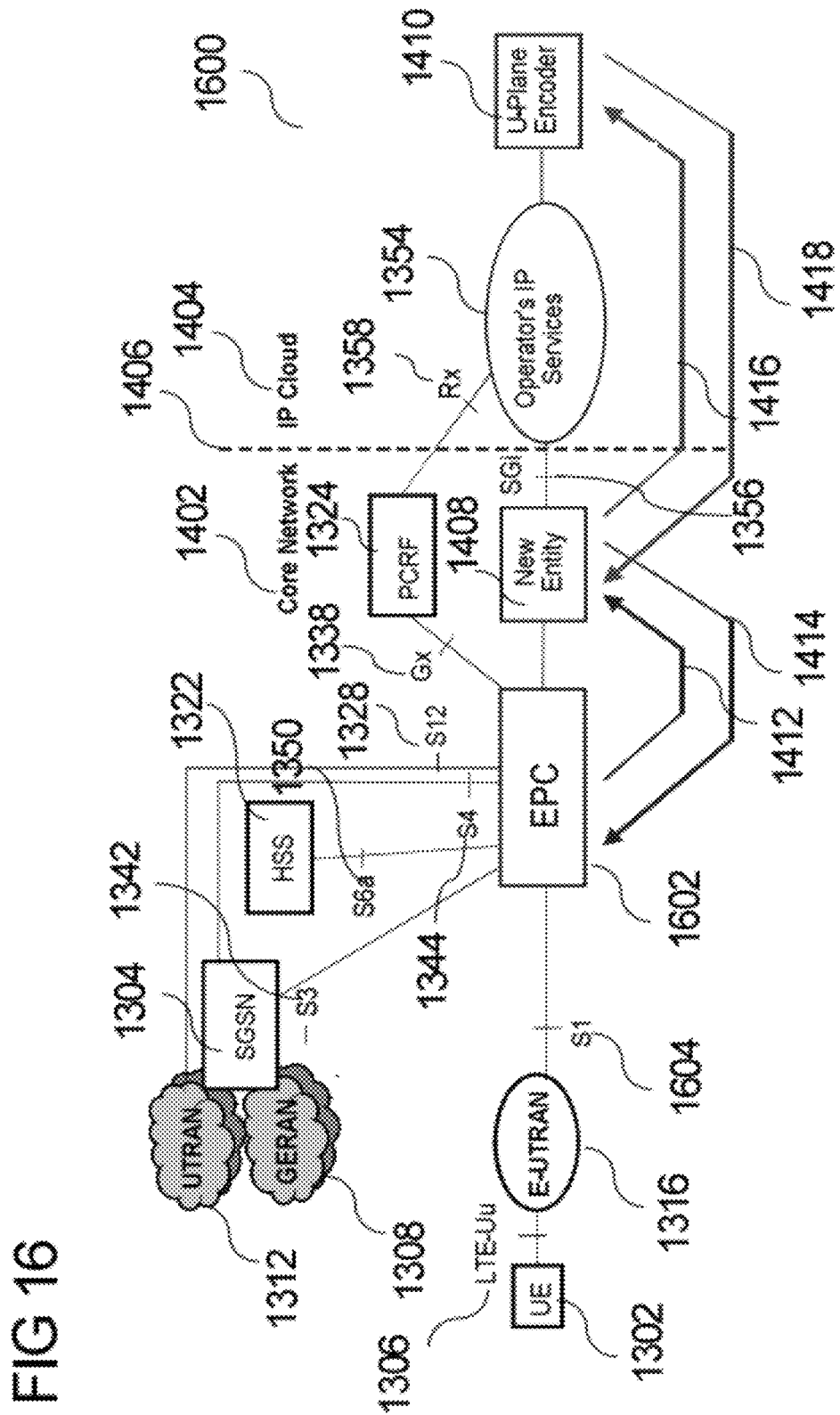
FIG. 16 shows a network architecture in accordance with an embodiment.

FIG. 16 shows a network architecture 1600 in accordance with an embodiment. Various parts of the network architecture 1600 may be the same as or similar to the parts of the network architecture 1500 of FIG. 15, and the same reference signs may be used for those parts and duplicate description may be omitted. In FIG. 16, a simplified architecture of the non-roaming 3GPP Core Network Architecture in accordance with an embodiment is depicted, wherein the EPC 1602 is shown as one block. The S1-MME interface and the S1-U interface are shown as one combined S1 interface 1604.

Figure 17:
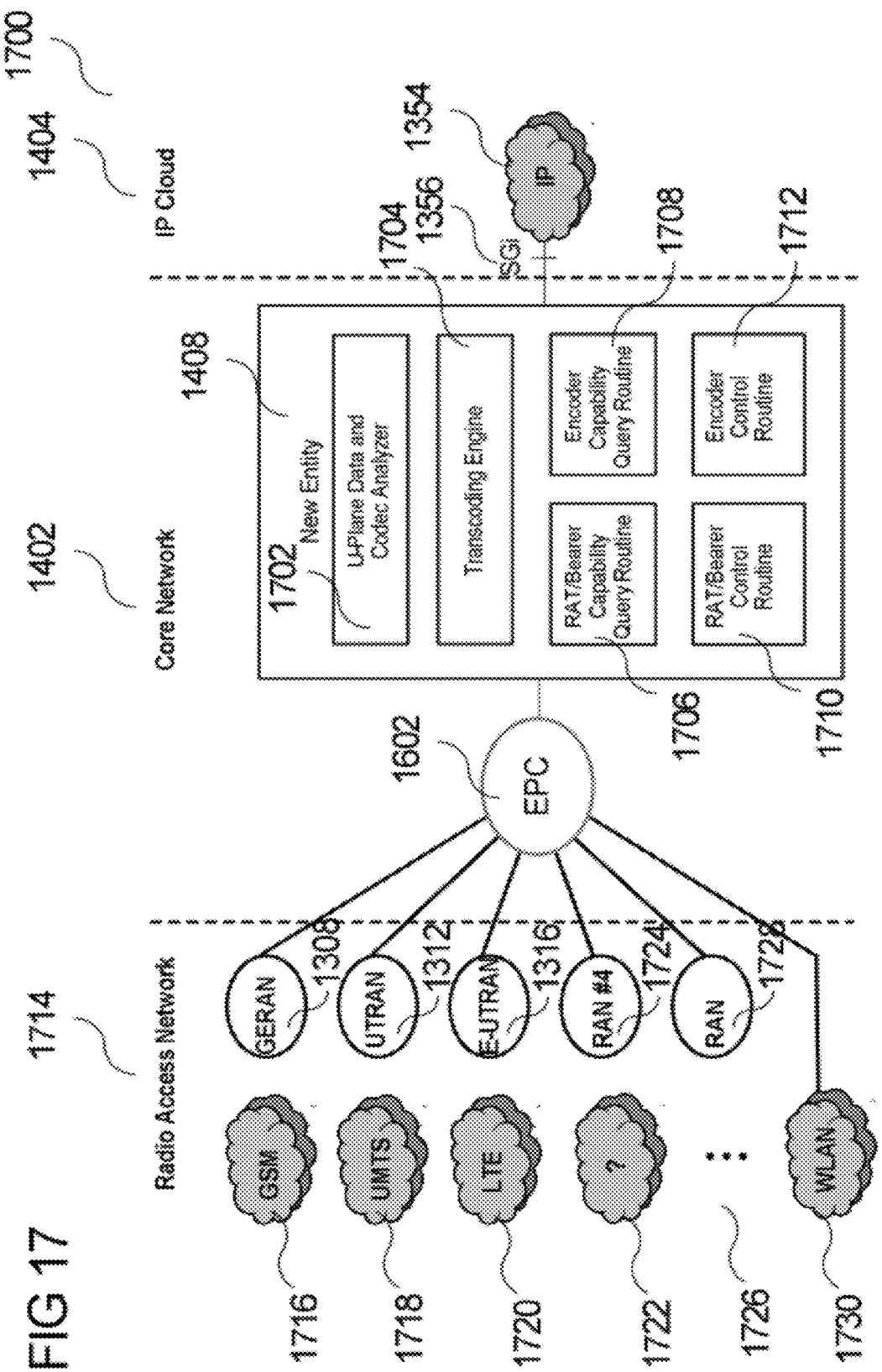
FIG. 17 shows a network architecture in accordance with an embodiment.

FIG. 17 shows a network architecture 1700 in accordance with an embodiment. Various parts of the network architecture 1700 may be the same as or similar to the parts of the network architecture 1600 of FIG. 16, and the same reference signs may be used for those parts and duplicate description may be omitted.

By way of example, the internal architecture (for example the building blocks) of the New Entity 1408 in the MNO's core network 1402 is shown.

According to various embodiments, the New Entity 1408 may include a Transcoding Engine 1704 in order to support transcoding of u-plane data, for example to turn a continuous flow of 'normal' real time streaming data into two or more flows encoded according to the principles of Multiple Description Coding (MDC) for distribution via distinct nodes (for example including different RATs) or via distinct Component Carriers in case of LTE-Advanced.

According to various embodiments, the New Entity 1408 may include a u-plane data and codec analyzer 1702. The u-plane data and codec analyzer 1702 may be provided to find out details, for example encoding details, about the u-plane data received from the source in the Internet.

According to various embodiments, the New Entity 1408 may be equipped with some query and control routines, for example one for the core network/RAN side, and one for the data sources in the Internet, as will be explained in more detail below.

According to various embodiments, the new entity 1408 may include a RAT/Bearer Capability Query Routine 1706 which may request node capabilities and theoretically possible configurations for a number of different bearers in various RATs, such as E-UTRAN 1316, UTRAN 1312, and GERAN 1308. The response to this query may be sent back to the New Entity 1408 by means of the first transaction as described above.

According to various embodiments, the new entity 1408 may include a RAT/Bearer Control Routine 1710 which may configure the different bearers in various RATs, such as E-UTRAN 1316, UTRAN 1312, and GERAN 1308. This message may be similar to the second transaction described above. For example, in case of LTE-Advanced, this message may include configuration information for the distinct Component Carriers.

According to various embodiments, the new entity 1408 may include an Encoder Capability Query Routine 1708 which may request capabilities from the Encoder Control entity which may be assigned either to a source server and/or an encoding engine. The response to this query may be sent back to the New Entity 1408 for example using the fourth transaction described above and may include information about re-configuration options related to Multiple Description Coding (MDC) and alike.

According to various embodiments, the new entity 1408 may include an Encoder Control Routine 1712 which may configure the source server and/or the encoding engine. This message may be similar to the third transaction described above.

According to various embodiments, a plurality of different radio access networks may be provided, as indicated by region 1714. For example, a GERAN 1308 may be provided for GSM 1716. For example, a UTRAN 1312 may be provided for UMTS 1718. For example, an E-UTRAN 1316 may be provided for LTE 1720. For example, a further RAN 1724 may be provided for another technology 1722. For example, a further RAN 1728 may be provided for further technologies 1726. For example, a WLAN 1730 access point may be provided.

FIG. 18 shows a network architecture 1800 in accordance with an embodiment. Various parts of the network architecture 1800 may be the same as or similar to the parts of the network architecture 1700 of FIG. 17, and the same reference signs may be used for those parts and duplicate description may be omitted.

According to various embodiments, two New Entities may be provided. For example, a first new entity $1408_1$ may reside in the MNO's core network 1402, and a second new entity $1408_2$ may reside in the Internet 1404 outside the MNO's domain.

According to various embodiments, a functionality split may be provided. For example, functions (for example all functions) that are related to RAT capabilities, bearer configuration and (for LTE-Advanced) Component Carriers may be executed by the first New Entity $1408_1$ inside the MNO's core network 1402. According to various embodiments, functions (for example all functions) pertaining to encoder issues may be executed by the second New Entity $1408_2$ in the Internet 1404. For example, for the exchange of information between the first new entity $1408_1$ and the second new entity $1408_2$ a new interface IFnew 1802 may be provided. Alternatively the first new entity $1408_1$ and the second new entity $1408_2$ may talk with each other over a modified SGi interface.

According to various embodiments, the first new entity $1408_1$ may include a first u-plane data and codec analyzer $1702_1$ (which may be similar to the u-plane data and codec analyzer 1702 of the new entity 1408 shown in FIG. 17), and a first transcoding engine $1704_1$ (which may be similar to the transcoding engine 1704 of the new entity 1408 shown in FIG. 17).

According to various embodiments, the second new entity $1408_2$ may include a second u-plane data and codec analyzer $1702_2$ (which may be similar to the u-plane data and codec analyzer 1702 of the new entity 1408 shown in FIG. 17), and a second transcoding engine $1704_2$ (which may be similar to the transcoding engine 1704 of the new entity 1408 shown in FIG. 17).

According to various embodiments, both the functional entities of the u-plane data and codec analyzer and of the transcoding engine may be placed (for example in entirety or for example in parts) either in the first New Entity $1408_1$ or in the second New Entity $1408_2$. According to various embodiments, it may be desired to keep all information about RAT capabilities, bearer configuration and (for LTE-Advanced) Component Carriers inside the MNO's core network 1402 and to do the final configuration decisions there, too. It may be therefore desired that the u-plane data and codec analyzer and the transcoding engine solely reside in the MNO's core network 1402, i.e. in first New Entity $1408_1$ rather than in the second New Entity $1408_2$.

According to various embodiments, a RAT may be an LTE RAT, which may be based on a 3GPP standard.

Figure 19:
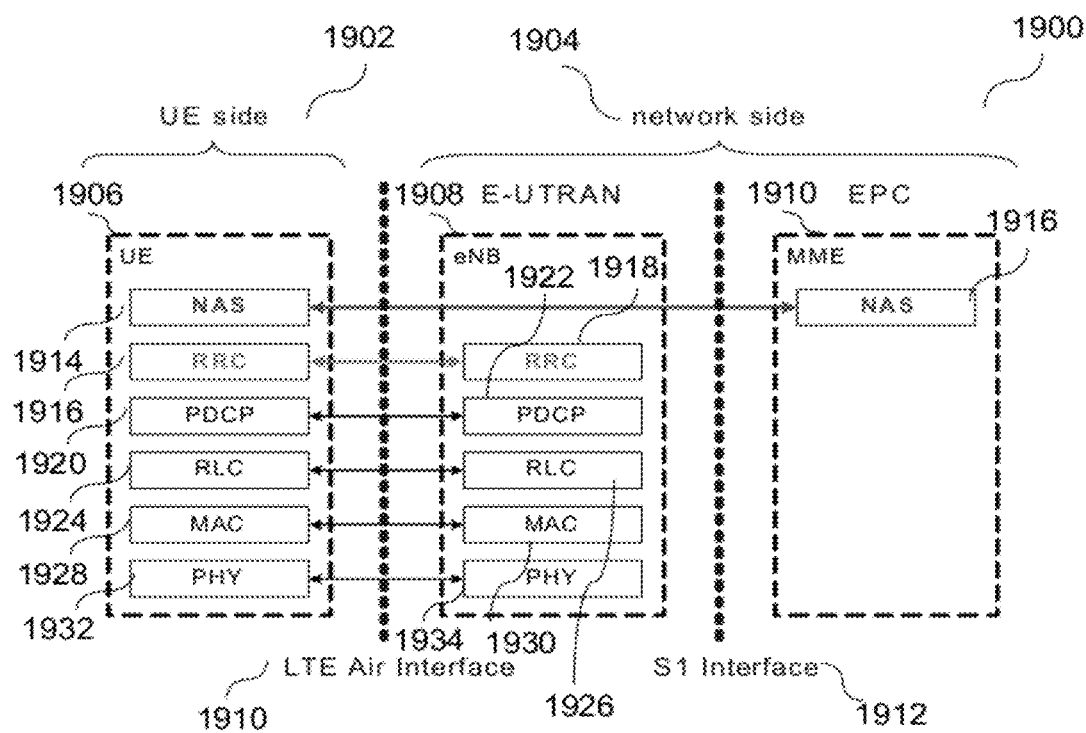
FIG. 19 shows a control-plane protocol stack in accordance with an embodiment.

FIG. 19 shows a control-plane protocol stack 1900 in accordance with an embodiment. By way of example, a control plane protocol stack 1900 of the LTE air interface 1910 between a UE 1906 on the UE side 1902 and an eNB 1908 (which may be provided in an E-UTRAN) and a MME 1910 (which may be provided in an EPC) on the network side 1904 are shown. An S1 interface 1912 may be provided between the eNB 1908 and the MME 1910.

According to various embodiments, in LTE, a Radio Resource Control (RRC) protocol may be terminated in eNB on the network side, as indicated by block 1918. The RRC protocol may perform (among other things):
  System Information Broadcast;
  Paging;
  RRC connection management;
  Radio bearer control;
  Mobility functions; and
  UE measurement reporting and control.

According to various embodiments, a Non Access Stratum (NAS) control protocol may be terminated in the MME 1910 on the network side 1904 as indicated by block 1916. The NAS control protocol may perform (among other things):
  EPS bearer management;
  Authentication;
  ECM-IDLE mobility handling;
  Paging origination in ECM-IDLE; and
  Security control.

According to various embodiments, for the enquiries of the RAT/Bearer Capability Query Routine and the commands of the RAT/Bearer Control Routine described above, some of the RRC and NAS functions listed above may be of relevance; these may be
  RRC connection management (RRC);

Radio bearer control (RRC); and

EPS bearer management (NAS).

According to various embodiments, information about eNB related capabilities may be requested from the RAT/Bearer Capability Query Routine or commands with eNB related configuration instructions may be sent from the RAT/Bearer Control Routine, and then the information exchange may go via the S1 Interface, because in LTE the RRC protocol may terminate in the eNB. According to various embodiments, time invariant pieces of information (about connection management and bearer control) may be stored in the MME.

According to various embodiments, the NAS control protocol may terminate in the UE, as indicated by block 1914. According to various embodiments, the RRC protocol may terminate in the UE, as indicated by block 1916.

According to various embodiment, a Packet Data Convergence Protocol (PDCP) may terminate in the UE, as indicated by block 1920, and in the eNB as indicated by block 1922.

According to various embodiment, a Radio Link Control (RLC) may terminate in the UE, as indicated by block 1924, and in the eNB as indicated by block 1926.

According to various embodiment, a Medium Access Control (MAC) protocol may terminate in the UE, as indicated by block 1928, and in the eNB as indicated by block 1930.

According to various embodiment, a Physical (PHY) control protocol may terminate in the UE, as indicated by block 1932, and in the eNB as indicated by block 1934.

According to various embodiments, other Radio Access Networks (RANs), such as the 'UTRAN' of UMTS with its concept of Radio Network Controllers (RNCs), may be different in this respect. In UMTS the RRC protocol layer may terminate in the RNC rather than in the NodeB.

According to various embodiments, mobile radio communication according to IMT-Advanced (International Mobile Telecommunications Advanced) may be provided.

According to various embodiments, a heterogeneous MBS (multicast/broadcast service) may be provided. According to various embodiments, redundant data flows with data rates adapted to the used RATs may be suitably selected. For example, higher data rates may be provided by short-range systems such as WiFi, ZigBee, etc., while medium data rates may be provided by wide area systems such as Cellular systems According to various embodiments, a RAT and/or a radio bearer may be selected. According to various embodiments, their respective characteristics may influence the encoding of data, for example when Multiple Description Coding (MDC) is deployed at the source.

According to various embodiments, codec characteristics and/or requirements may influence the RAT selection, bearer configuration, and Component Carrier (de)activation.

According to various embodiments, mechanisms may be provided for suitable selection of codecs based on their characteristics and/or requirements influencing the RAT selection, bearer configuration, and Component Carrier (de)activation.

According to various embodiments, as has been illustrated above, users may receive multiple (redundant) flows of an identical source signal over various heterogeneous nodes. For example, a UE capable of operating multiple distinct RATs simultaneously may be enabled to exploit these various streams in order to obtain always the best QoS which may be achieved by the full exploitation of a given radio context in a given geographic area.

According to various embodiments, in the context of LTE-Advanced with Carrier Aggregation, a UE may receive multiple redundant flows of an identical source signal via distinct Component Carriers, while every single flow may be adapted to the distinct Component Carrier's individual QoS characteristics.

According to various embodiments, the UE may be able to fully exploit the heterogeneous radio context in order to obtain the good QoS at the low cost (for example in terms of resource usage, power consumption, subscription cost, or the like).

According to various embodiments, the QoS perceived by the UE may be not interrupted or may be less interrupted at some locations. The combination of a heterogeneous multitude of RATs may introduce a new level of diversity allowing for a continued level of QoS. According to various embodiments, if ever one RAT is suddenly not operational any more, the data may be obtained through other neighboring RATs. For example, in the case of video services, this may allow to have a smooth and seamless continuation of the service even if any of the available links break.

According to various embodiments, the operator may be able to better exploit its available resources due to an optimized distribution of high-data-rate services (for example video services) via other networks and by building on a diversity of technologies.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A radio communication device, comprising:
    a first receiver configured to receive from a first cell first data representing a content encoded using a first codec;
    a second receiver configured to receive from a second cell second data representing the content encoded using a second codec;
    a combiner configured to combine the first data and the second data;
    a decoder configured to decode the combined data;
    a reception discontinuation determiner configured to determine whether the first receiver stops receiving the first data and to determine whether the second receiver stops receiving the second data;
    wherein the decoder is further configured to decode the first data when the reception discontinuation determiner determines that the second receiver stops receiving the second data, and
    wherein the decoder is further configured to decode the second data when the reception discontinuation determiner determines that the first receiver stops receiving the first data.

2. The radio communication device of claim 1, further comprising:
    a further receiver configured to receive from a further cell further data representing the content encoded using a further codec.

3. The radio communication device of claim 1, further comprising:
    a locator configured to determine the position of the radio communication device.

4. The radio communication device of claim 1, further comprising:

an available cell determiner configured to determine, whether a predetermined cell is available for the radio communication device.

5. The radio communication device of claim 1, further comprising:
a data requester configured to request transmission of further data representing the content encoded using a further codec from a further cell from an information provider.

6. The radio communication device of claim 1, further comprising:
a quality of service determiner configured to determine a required quality of service of the content for the radio communication device.

7. A method for controlling a radio communication device, the method comprising:
receiving from a first cell first data representing a content encoded using a first codec;
receiving from a second cell second data representing the content encoded using a second codec;
combining the first data and the second data;
decoding the combined data;
determining whether the first receiver stops receiving the first data and determining whether the second receiver stops receiving the second data;
decoding the first data when it is determined that the second receiver stops receiving the second data, and
decoding the second data when it is determined that the first receiver stops receiving the first data.

8. The method of claim 7, further comprising:
determining the position of the radio communication device.

9. The method of claim 7, further comprising:
determining, whether a predetermined cell is available for the radio communication device.

10. The method of claim 7, further comprising:
requesting transmission of further data representing the content encoded using a further codec from a further cell from an information provider.

11. The method of claim 7, further comprising:
determining a required quality of service of the content for the radio communication device.

\* \* \* \* \*